US010934405B2

United States Patent
Shibai et al.

(10) Patent No.: US 10,934,405 B2
(45) Date of Patent: Mar. 2, 2021

(54) SYNTHETIC POLYMER FILM WHOSE SURFACE HAS MICROBICIDAL ACTIVITY, PLASTIC PRODUCT WHICH INCLUDES SYNTHETIC POLYMER FILM, STERILIZATION METHOD WITH USE OF SURFACE OF SYNTHETIC POLYMER FILM, PHOTOCURABLE RESIN COMPOSITION, AND MANUFACTURING METHOD OF SYNTHETIC POLYMER FILM

(71) Applicant: Sharp Kabushiki Kaisha, Sakai (JP)

(72) Inventors: Yasuhiro Shibai, Sakai (JP); Miho Yamada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/352,993

(22) Filed: Mar. 14, 2019

(65) Prior Publication Data
US 2019/0284355 A1 Sep. 19, 2019

(30) Foreign Application Priority Data
Mar. 15, 2018 (JP) .............................. JP2018-048186

(51) Int. Cl.
  *C08J 5/18* (2006.01)
  *B32B 23/08* (2006.01)
  (Continued)

(52) U.S. Cl.
  CPC ..................... *C08J 5/18* (2013.01);
    *B32B 3/30* (2013.01); *B32B 23/08* (2013.01);
    *B32B 27/30* (2013.01);
  (Continued)

(58) Field of Classification Search
  CPC ...... C08J 5/18; C08J 2333/14; C08J 133/144; C08J 7/065; C08J 2367/02; C08J 2369/00; C08J 2301/12; C08K 5/0058; C08K 5/092; C08K 5/07; C08K 5/3417; C08F 265/06; C08F 220/28; C08F 2/44; C08F 2220/286; B32B 27/30; B32B 3/30; B32B 27/365;
  (Continued)

(56) References Cited

U.S. PATENT DOCUMENTS 9,781,924 B2 10/2017 Yamada et al.
9,781,925 B2 10/2017 Yamada et al.
(Continued)

FOREIGN PATENT DOCUMENTS

AU 2013903399 9/2013
CA 2 323 719 A1 4/2001
(Continued)

OTHER PUBLICATIONS

Translation to English of JP 2016-104545 via espacenet. accessed Jun. 22, 2020. (Year: 2016).*
(Continued)

*Primary Examiner* — Nancy R Johnson
(74) *Attorney, Agent, or Firm* — Keating & Bennett, LLP

(57) ABSTRACT

A synthetic polymer film has a surface which has a plurality of raised or recessed portions, wherein the synthetic polymer film has a cross-linked structure, and the synthetic polymer film contains an antimicrobial additive which is permitted by law for addition to food and which has an antimicrobial effect.

26 Claims, 9 Drawing Sheets

(51) Int. Cl.

| | | |
|---|---|---|
| *B32B 27/30* | (2006.01) | |
| *B32B 27/36* | (2006.01) | |
| *B32B 3/30* | (2006.01) | |
| *C08F 2/48* | (2006.01) | |
| *C08F 265/06* | (2006.01) | |
| *C08K 5/00* | (2006.01) | |
| *C08K 5/07* | (2006.01) | |
| *C08K 5/092* | (2006.01) | |
| *C08K 5/3417* | (2006.01) | |

(52) U.S. Cl.
CPC .............. *B32B 27/365* (2013.01); *C08F 2/48* (2013.01); *C08F 265/06* (2013.01); *C08K 5/0058* (2013.01); *C08K 5/07* (2013.01); *C08K 5/092* (2013.01); *C08K 5/3417* (2013.01); *B32B 2305/72* (2013.01); *B32B 2307/7145* (2013.01); *B32B 2439/70* (2013.01)

(58) Field of Classification Search
CPC ................ B32B 23/08; B32B 2439/70; B32B 2307/7145; B32B 2307/2305; B32B 2307/72; C09D 4/00; C09D 5/14; C09D 5/1681; C09D 5/1687; C09D 5/1606
See application file for complete search history.

(56) References Cited

U.S. PATENT DOCUMENTS

| | | | |
|---|---|---|---|
| 9,781,926 | B2 | 10/2017 | Yamada et al. |
| 10,136,638 | B2 | 11/2018 | Yamada et al. |
| 2003/0164326 | A1 | 9/2003 | Ebert et al. |
| 2003/0205475 | A1 | 11/2003 | Sawitowski |
| 2007/0159698 | A1 | 7/2007 | Taguchi et al. |
| 2008/0145390 | A1 | 6/2008 | Taylor et al. |
| 2009/0252825 | A1 | 10/2009 | Taguchi et al. |
| 2010/0009137 | A1 | 1/2010 | Kodama |
| 2010/0203161 | A1 | 8/2010 | Gehri et al. |
| 2010/0234323 | A1 | 9/2010 | Holzl et al. |
| 2011/0038910 | A1 | 2/2011 | Faucher et al. |
| 2011/0235181 | A1 | 9/2011 | Hayashibe et al. |
| 2011/0281068 | A1 | 11/2011 | David et al. |
| 2012/0218639 | A1 | 8/2012 | Minoura et al. |
| 2012/0318772 | A1 | 12/2012 | Minoura et al. |
| 2013/0057958 | A1 | 3/2013 | Minoura et al. |
| 2013/0344290 | A1 | 12/2013 | Yu et al. |
| 2014/0004304 | A1 | 1/2014 | Yu et al. |
| 2014/0077418 | A1 | 3/2014 | Otani et al. |
| 2015/0140154 | A1 | 5/2015 | Isurugi et al. |
| 2015/0168610 | A1 | 6/2015 | Fukui et al. |
| 2015/0273755 | A1 | 10/2015 | Yee et al. |
| 2016/0113274 | A1 | 4/2016 | Yamada et al. |
| 2016/0212989 | A1 | 7/2016 | Juodkazis et al. |
| 2016/0324172 | A1* | 11/2016 | Williams ............... A01N 43/16 |
| 2017/0258081 | A1 | 9/2017 | Yamada et al. |
| 2018/0036995 | A1 | 2/2018 | Okazaki et al. |
| 2018/0134859 | A1 | 5/2018 | Yamada et al. |
| 2018/0255809 | A1 | 9/2018 | Yamada et al. |
| 2019/0276218 | A1* | 9/2019 | Freedman ............. B65B 25/067 |

FOREIGN PATENT DOCUMENTS

| | | | |
|---|---|---|---|
| CN | 201329050 | Y | 10/2009 |
| DE | 199 50 452 | A1 | 4/2001 |
| JP | 08-024843 | A | 1/1996 |
| JP | 08-300549 | A | 11/1996 |
| JP | 11-010724 | A | 1/1999 |
| JP | 2001-219464 | A | 8/2001 |
| JP | 2001-310412 | A | 11/2001 |
| JP | 2002-012257 | A | 1/2002 |
| JP | 2005-055114 | A | 3/2005 |
| JP | 2008-197217 | A | 8/2008 |
| JP | 4265729 | B2 | 5/2009 |
| JP | 2009-166502 | A | 7/2009 |
| JP | 2010-000719 | A | 1/2010 |
| JP | 2010-079200 | A | 4/2010 |
| JP | 2012-078438 | A | 4/2012 |
| JP | 2012-514239 | A | 6/2012 |
| JP | 2012-208169 | A | 10/2012 |
| JP | 2013-033287 | A | 2/2013 |
| JP | 2013-078573 | A | 5/2013 |
| JP | 2013-208817 | A | 10/2013 |
| JP | 2013-245216 | A | 12/2013 |
| JP | 2014-005341 | A | 1/2014 |
| JP | 2014-029391 | A | 2/2014 |
| JP | 2014-066975 | A | 4/2014 |
| JP | 2014-509967 | A | 4/2014 |
| JP | 2014-511779 | A | 5/2014 |
| JP | 2014-202955 | A | 10/2014 |
| JP | 2015-024549 | A | 2/2015 |
| JP | 2015-152659 | A | 8/2015 |
| JP | 5788128 | B1 | 9/2015 |
| JP | 2016-026546 | A | 2/2016 |
| JP | 2016-093939 | A | 5/2016 |
| JP | 2016-104545 | A | 6/2016 |
| JP | 2016-210164 | A | 12/2016 |
| JP | 2017-048132 | A | 3/2017 |
| WO | 2007/097454 | A1 | 8/2007 |
| WO | 2011/019834 | A1 | 2/2011 |
| WO | 2011/052652 | A1 | 5/2011 |
| WO | 2011/125486 | A1 | 10/2011 |
| WO | 2011/148721 | A1 | 12/2011 |
| WO | 2012/161315 | A1 | 11/2012 |
| WO | 2013/183576 | A1 | 12/2013 |
| WO | 2013/191092 | A1 | 12/2013 |
| WO | 2014/021376 | A1 | 2/2014 |
| WO | 2014/171365 | A1 | 10/2014 |
| WO | 2015/163018 | A1 | 10/2015 |
| WO | 2016/080245 | A1 | 5/2016 |
| WO | 2016/084745 | A1 | 6/2016 |
| WO | 2016/104421 | A1 | 6/2016 |
| WO | 2016/143778 | A1 | 9/2016 |
| WO | 2016/175170 | A1 | 11/2016 |
| WO | 2016/182444 | A1 | 11/2016 |
| WO | 2016/208540 | A1 | 12/2016 |
| WO | 2017/090661 | A1 | 6/2017 |
| WO | 2017/168893 | A1 | 10/2017 |
| WO | 2018/154843 | A1 | 8/2018 |

OTHER PUBLICATIONS

Translation to English of JP 2014-005341 via espacenet. accessed Jun. 24, 2020 (Year: 2014).*

Cleaning Guide—How to Clean Surfaces; "Do-It-All-Cleaning Guide"; http://www.goodhousekeeping.com/home/cleaning/tips/a18875/how-to-clean; Sep. 7, 2011; pp. 1-12.

Trafton, A.; "MIT's anti-microbial "paint" kills flu, bateria"; http://chemistry.mit.edu/mIts-anti-microbial-paint-kills-flu-bacteria; Nov. 30, 2006; pp. 1-4.

Raybaudi-Massilia, R. et al.; "Control of Pathogenic and Spoilage Microorganisms in Fresh-cut Fruits and Fruit Juices by Traditional and Alternative Natural . . . "; Comprehensive Reviews in Food Science and Food Safety; Jul. 2009; 25 pages.

Hasan, J. et al.; "Antibacterial surfaces: the quest for a new generation of biomaterials"; Trends in Biotechnology; May 2013; vol. 31; No. 5; pp. 295-304.

"Synthetic Polymer Film Whose Surface Has Microbicidal Activity, Multilayer Structure Having Synthetic Polymer Film, Sterilization Method With the Use of Surface of Synthetic Polymer Film, Method for Reactivating Surface of Synthetic Polymer Film, Mold for Production of Synthetic Polymer Film, and Mold Manufacuring Method"; U.S. Appl. No. 14/771,833, filed Sep. 1, 2015.

"Synthetic Polymer Film Whose Surface Has Microbicidal Activity, Multilayer Structure Having Synthetic Polymer Film, Sterilization Method With the Use of Surface of Synthetic Polymer Film, Method for Reactivating Surface of Synthetic Polymer Film, Mold for Production of Synthetic Polymer Film, and Mold Manufacuring Method"; U.S. Appl. No. 15/386,131, filed Dec. 21, 2016.

"Filter and Container Having Microbicidal Activity"; U.S. Appl. No. 14/897,252, filed Dec. 10, 2015.

(56) References Cited

OTHER PUBLICATIONS

"Synthetic Polymer Film Having Surface Provided With Batericidal Activity"; U.S. Appl. No. 15/126,078, filed Sep. 14, 2016.
"Synthetic Polymer Film Whose Surface Has Microbicidal Activity, Multilayer Structure Having Synthetic Polymer Film, Sterilization Method With the Use of Surface of Synthetic Polymer Film, Method for Reactivating Surface of Synthetic Polymer Film, Mold for Production of Synthetic Polymer Film, and Mold Manufacuring Method"; U.S. Appl. No. 15/437,044, filed Feb. 20, 2017.
"Food Preservation Method, Food Film, Food Container, and Food Handling Method"; U.S. Appl. No. 15/539,631, filed Jun. 23, 2017.
"Synthetic Polymer Film Provided With Surface Having Sterilizing Activity"; U.S. Appl. No. 15/739,450, filed Dec. 22, 2017.
"Synthetic Polymer Film Whose Surface Has Microbicidal Activity, Multilayer Structure Having Synthetic Polymer Film, Sterilization Method With the Use of Surface of Synthetic Polymer Film, Method for Reactivating Surface of Synthetic Polymer Film, Mold for Production of Synthetic Polymer Film, and Mold Manufacuring Method"; U.S. Appl. No. 15/784,771, filed Oct. 16, 2017.
"Synthetic Polymer Film Whose Surface Has Microbicidal Activity, Multilayer Structure Having Synthetic Polymer Film, Sterilization Method With the Use of Surface of Synthetic Polymer Film, Method for Reactivating Surface of Synthetic Polymer Film, Mold for Production of Synthetic Polymer Film, and Mold Manufacuring Method"; U.S. Appl. No. 15/592,922, filed May 11, 2017.
"Plastic Product Which Includes Synthetic Polymer Film Whose Surface Has Microbicidal Activity"; U.S. Appl. No. 16/131,688, filed Sep. 14, 2018.
"Synthetic Polymer Film Whose Surface Has Microbicidal Activity, Photocurable Resin Composition, Manufacturing Method of Synthetic Polymer Film, and Sterilization Method With Use of Surface of Synthetic Polymer Film"; U.S. Appl. No. 16/141,883, filed Sep. 25, 2018.
"Synthetic Polymer Film Whose Surface Has Microbicidal Activity, Multilayer Structure Having Synthetic Polymer Film, Sterilization Method With the Use of Surface of Synthetic Olymer Film, Method for Reactivating Surface of Synthetic Polymer Film, Mold for Roduction of Synthetic Polymer Film, and Mold Manufacuring Method"; U.S. Appl. No. 16/201,609, filed Nov. 27, 2018.
"Synthetic Polymer Film Whose Surface Has Microbicidal Activity, Multilayer Structure Having Synthetic Polymer Film, Sterilization Method With the Use of Surface of Synthetic Polymer Film, Method for Reactivating Surface of Synthetic Polymer Film, Mold for Production of Synthetic Polymer Film, and Mold Manufacuring Method"; U.S. Appl. NO. 16/201,623, filed Nov. 27, 2018.
"Synthetic Polymer Film Having Surface Provided With Batericidal Activity"; U.S. Appl. No. 16/275,072, filed Feb. 13, 2019.
Espeel, P. et al.; "One-pot, additivie-free preparation of functionalized polyurethanes via amine-thiol-ene conjugation"; Polymer Chemistry, Apr. 2013; pp. 2449-2456.
Pogodin, S. et al.; "Biophysical Model of Bacterial Cell Interacgtions with Nanopatterned Cicada Wing Surfaces"; Biophysical Journal; vol. 104; Feb. 2013; pp. 835-840.
Compound Summary for CID 3086063, Tecoflex from PubChem, accessed Jan. 17, 2018; 13 pages.
Ivanova, E. et al.; "Bactericidal activity of black silicon"; Nature Communications; Nov. 26, 2013; 19 pages.
Epstein, A. et al.; "Liquid-infused structured surfaces with exceptional anti-biofouling performance"; Proceedings of the National Academy of Sciences of the United States of America; vol. 109; No. 33; Aug. 14, 2012; pp. 13182-13187.
Ivanova, E. et al.; "Natural Bactericidal Surfaces: Mechanical Rupture of Pseudomonas aeruginosa Cells by Cicada Wings"; Small; Aug. 20, 2012; pp. 1-6.
Yao, C., et al.; "Decreased bacteria density on nanostructured polyurethane"; Journal of Biomedical Materials Research Part A; 2014; 102A; pp. 1823-1828.

\* cited by examiner 1.00μm

500nm

5μm

1μm

SYNTHETIC POLYMER FILM WHOSE SURFACE HAS MICROBICIDAL ACTIVITY, PLASTIC PRODUCT WHICH INCLUDES SYNTHETIC POLYMER FILM, STERILIZATION METHOD WITH USE OF SURFACE OF SYNTHETIC POLYMER FILM, PHOTOCURABLE RESIN COMPOSITION, AND MANUFACTURING METHOD OF SYNTHETIC POLYMER FILM

BACKGROUND

1. Technical Field

The present invention relates to a synthetic polymer film whose surface has a microbicidal activity, a plastic product which includes the synthetic polymer film, a sterilization method with the use of the surface of the synthetic polymer film, a photocurable resin composition for use in formation of the synthetic polymer film, and a manufacturing method of the synthetic polymer film.

2. Description of the Related Art

Recently, it was reported that surficial nanostructures of black silicon, wings of cicadas and dragonflies have a bactericidal activity (Ivanova, E. P. et al., "Bactericidal activity of black silicon", Nat. Commun. 4:2838 doi: 10.1038/ncomms3838 (2013)). Reportedly, the physical structure of the nanopillars that black silicon and wings of cicadas and dragonflies have produces a bactericidal activity.

According to Ivanova, E. P. et al., black silicon has the strongest bactericidal activity on Gram-negative bacteria, while wings of dragonflies have a weaker bactericidal activity, and wings of cicadas have a still weaker bactericidal activity. Black silicon has 500 nm tall nanopillars. Wings of cicadas and dragonflies have 240 nm tall nanopillars. The static contact angle (hereinafter, also simply referred to as "contact angle") of the black silicon surface with respect to water is 80°, while the contact angles of the surface of wings of dragonflies and cicadas with respect to water are 153° and 159°, respectively. It is estimated that black silicon is mainly made of silicon, and wings of dragonflies and cicadas are made of chitin. According to Ivanova, E. P. et al., the composition of the surface of black silicon is generally a silicon oxide, and the composition of the surface of wings of dragonflies and cicadas is generally a lipid.

SUMMARY

The mechanism of killing bacteria by nanopillars is not clear from the results described in Ivanova, E. P. et al. It is also not clear whether the reason why black silicon has a stronger bactericidal activity than wings of dragonflies and cicadas resides in the difference in height or shape of nanopillars, in the difference in surface free energy (which can be evaluated by the contact angle), in the materials that constitute nanopillars, or in the chemical properties of the surface.

The bactericidal activity of black silicon is difficult to utilize because black silicon is poor in mass productivity and is hard but brittle so that the shapability is poor.

A major object of the present invention is to provide a synthetic polymer film whose surface has a microbicidal activity, a plastic product which includes the synthetic polymer film, a sterilization method with the use of the surface of the synthetic polymer film, a photocurable resin composition for use in formation of the synthetic polymer film, and a manufacturing method of the synthetic polymer film.

A synthetic polymer film of an embodiment of the present invention has a surface which has a plurality of raised or recessed portions, wherein the synthetic polymer film has a cross-linked structure, and the synthetic polymer film contains an antimicrobial additive which is permitted by law for addition to food and which has an antimicrobial effect.

In one embodiment, when viewed in a normal direction of the synthetic polymer film, a two-dimensional size of the plurality of raised or recessed portions is in the range of more than 20 nm and not more than 1 μm.

In one embodiment, when viewed in the normal direction of the synthetic polymer film, the two-dimensional size of the plurality of raised or recessed portions is less than 500 nm.

In one embodiment, when viewed in the normal direction of the synthetic polymer film, the two-dimensional size of the plurality of raised or recessed portions is not less than 500 nm.

In one embodiment, the antimicrobial additive contains an organic carboxylic acid, and at the lapse of 5 minutes since placing a 200 μL drop of water on the surface of the synthetic polymer film, a pH of an aqueous solution is not more than 5, and an area equivalent circle diameter of the aqueous solution is not less than 20 mm. In one embodiment, the organic carboxylic acid is not unlimitedly soluble in water.

In one embodiment, an amount of water required for dissolving 1 g of the organic carboxylic acid is equal to or greater than 1 mL and less than 10000 mL. An amount of water required for dissolving 1 g of the organic carboxylic acid may be equal to or greater than 10 mL or may be less than 100 mL.

In one embodiment, the organic carboxylic acid is succinic acid, adipic acid, citric acid, alginic acid or phytic acid.

In one embodiment, the synthetic polymer film further contains an emulsifier which is permitted by law for addition to food.

In one embodiment, a HLB value of the emulsifier is not less than 7 and not more than 14. In one embodiment, the HLB value of the emulsifier is not less than 9 and not more than 11.

In one embodiment, the synthetic polymer film is made of a photocurable resin which contains a photopolymerization initiator. In one embodiment, the photocurable resin is an acrylic resin. In one embodiment, the photocurable resin is a UV-curable resin.

In one embodiment, a proportion of the antimicrobial additive contained in the photocurable resin to an entirety of the photocurable resin is not less than 0.1 mass % and not more than 10 mass %. In one embodiment, the proportion of the antimicrobial additive contained in the photocurable resin to the entirety of the photocurable resin is not less than 1 mass % and not more than 5 mass %.

In one embodiment, the proportion of the emulsifier contained in the photocurable resin to the entirety of the photocurable resin is not less than 0.1 mass % and not more than 5 mass %, preferably not less than 0.5 mass % and not more than 3 mass %.

In one embodiment, the photopolymerization initiator does not substantially generate any organic carboxylic acid through photodecomposition.

In one embodiment, the photocurable resin is radically polymerizable.

In one embodiment, the photopolymerization initiator contains at least one of the group consisting of ethanone,1-[9-ethyl-6-(2-methylbenzoyl)-9H-carbazole-3-yl]-,1-(O-acetyloxime), 2-hydroxy-1-{4-[4-(2-hydroxy-2-methyl-propionyl)-benzyl]-phenyl}-2-methyl-propan-1-one, and 1-[4-(2-hydroxyethoxy)-phenyl]-2-hydroxy-2-methyl-1-propane-1-one.

In one embodiment, the cross-linked structure contains none of a nitrogen element which is a constituent of a urethane bond and a fluorine element.

In one embodiment, the cross-linked structure contains an ethylene oxide unit.

In one embodiment, the cross-linked structure contains a 2-(2-vinyloxy ethoxy)ethyl (meth)acrylate monomer unit.

A plastic product according to an embodiment of the present invention includes: a plastic base which has a surface; and the synthetic polymer film as set forth in any of the foregoing paragraphs, the synthetic polymer film being provided on the surface of the plastic base.

In one embodiment, the plastic base includes at least one of the group consisting of a triacetyl cellulose film, a polyethylene terephthalate film and a polycarbonate film, and the plastic product is a multilayer film which includes the at least one film and the synthetic polymer film.

In one embodiment, the plastic base contains polycarbonate, and the plastic product forms a container.

A liquid sterilizing method of an embodiment of the present invention is a method for sterilizing a liquid including water by bringing the liquid into contact with the surface of the synthetic polymer film as set forth in any of the foregoing paragraphs.

A photocurable resin composition of an embodiment of the present invention is a photocurable resin composition for use in production of a synthetic polymer film, including: a photocurable resin; an antimicrobial additive which is permitted by law for addition to food and which has an antimicrobial effect; and a photopolymerization initiator. In one embodiment, the photocurable resin is an acrylic resin. In one embodiment, the photocurable resin is a UV-curable resin.

In one embodiment, the photopolymerization initiator contains at least one of the group consisting of ethanone,1-[9-ethyl-6-(2-methylbenzoyl)-9H-carbazole-3-yl]-,1-(O-acetyloxime), 2-hydroxy-1-{4-[4-(2-hydroxy-2-methyl-propionyl)-benzyl]-phenyl}-2-methyl-propan-1-one, and 1-[4-(2-hydroxyethoxy)-phenyl]-2-hydroxy-2-methyl-1-propane-1-one.

A synthetic polymer film manufacturing method of an embodiment of the present invention includes a step of mixing water in the photocurable resin composition as set forth in any of the foregoing paragraphs and thereafter irradiating the resultant photocurable resin composition with light. In one embodiment, the amount of the water is not less than 1 mass % and not more than 10 mass % with respect to the entirety of the photocurable resin composition.

According to an embodiment of the present invention, a synthetic polymer film whose surface has a microbicidal activity, a plastic product which includes the synthetic polymer film, a sterilization method with the use of the surface of the synthetic polymer film, a photocurable resin composition for use in formation of the synthetic polymer film, and a manufacturing method of the synthetic polymer film are provided.

DETAILED DESCRIPTION

Hereinafter, a synthetic polymer film whose surface has a microbicidal effect and a sterilization method with the use of the surface of the synthetic polymer film according to embodiments of the present invention are described with reference to the drawings.

In this specification, the following terms are used.

"Sterilization" (or "microbicidal") means reducing the number of proliferative microorganisms contained in an object, such as solid or liquid, or a limited space, by an effective number.

"Microorganism" includes viruses, bacteria, and fungi.

"Antimicrobial" generally includes suppressing and preventing multiplication of microorganisms and includes suppressing dinginess and slime which are attributed to microorganisms.

The present applicant conceived a method for producing an antireflection film (an antireflection surface) which has a moth-eye structure with the use of an anodized porous alumina layer. Using the anodized porous alumina layer enables manufacture of a mold which has an inverted moth-eye structure with high mass-productivity.

The present applicant developed the above-described technology and arrived at a synthetic polymer film whose surface has a microbicidal effect (see, for example, WO 2015/163018, WO 2016/080245 and WO 2016/208540). The present applicant also arrived at a film for food and a container for food which include a synthetic polymer film whose surface has a microbicidal activity, and a method for preserving food and a method for handling food with the use of the film or container (see WO 2016/104421). The entire disclosures of WO 2015/163018, WO 2016/080245, WO 2016/208540 and WO 2016/104421 are incorporated by reference in this specification.

The configuration of a synthetic polymer film according to an embodiment of the present invention is described with reference to FIG. 1A and FIG. 1B.

Figure 1A:
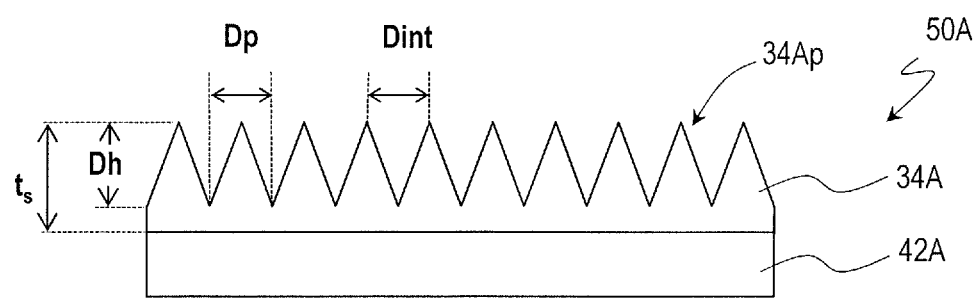
FIG. 1A and FIG. 1B are schematic cross-sectional views of synthetic polymer films 34A and 34B, respectively, according to embodiments of the present invention.
Figure 1B:
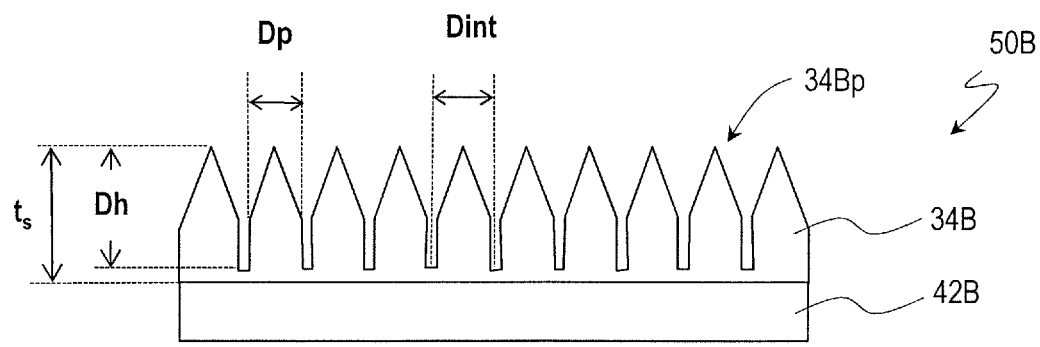

FIG. 1A and FIG. 1B respectively show schematic cross-sectional views of synthetic polymer films 34A and 34B according to embodiments of the present invention. The synthetic polymer films 34A and 34B described herein as examples are formed on base films 42A and 42B, respectively, although the present invention is not limited to these examples. The synthetic polymer films 34A and 34B can be directly formed on a surface of an arbitrary object.

A film 50A shown in FIG. 1A includes a base film 42A and a synthetic polymer film 34A provided on the base film 42A. The synthetic polymer film 34A has a plurality of raised portions 34Ap over its surface. The plurality of raised portions 34Ap constitute a moth-eye structure. When viewed in a normal direction of the synthetic polymer film 34A, the two-dimensional size of the raised portions 34Ap, $D_p$, is in the range of more than 20 nm and less than 500 nm. Here, the "two-dimensional size" of the raised portions 34Ap refers to the diameter of a circle equivalent to the area of the raised portions 34Ap when viewed in a normal direction of the surface. When the raised portions 34Ap have a conical shape, for example, the two-dimensional size of the raised portions 34Ap is equivalent to the diameter of the base of the cone. The typical adjoining distance of the raised portions 34Ap, $D_{int}$, is more than 20 nm and not more than 1000 nm. When the raised portions 34Ap are densely arranged so that there is no gap between adjoining raised portions 34Ap (e.g., the bases of the cones partially overlap each other) as shown in FIG. 1A, the two-dimensional size of the raised portions 34Ap, $D_p$, is equal to the adjoining distance $D_{int}$. The typical height of the raised portions 34Ap, $D_h$, is not less than 50 nm and less than 500 nm. As will be described later, a microbicidal activity is exhibited even when the height $D_h$ of the raised portions 34Ap is not more than 150 nm. The thickness of the synthetic polymer film 34A, $t_s$, is not particularly limited but only needs to be greater than the height $D_h$ of the raised portions 34Ap.

The synthetic polymer film 34A shown in FIG. 1A has the same moth-eye structure as the antireflection films described in Japanese Patent No. 4265729, Japanese Laid-Open Patent Publication No. 2009-166502, WO 2011/125486 and WO 2013/183576. From the viewpoint of producing an antireflection function, it is preferred that the surface has no flat portion, and the raised portions 34Ap are densely arranged over the surface. Further, the raised portions 34Ap preferably has a such shape that the cross-sectional area (a cross section parallel to a plane which is orthogonal to an incoming light ray, e.g., a cross section parallel to the surface of the base film 42A) increases from the air side to the base film 42A side, e.g., a conical shape. From the viewpoint of suppressing interference of light, it is preferred that the raised portions 34Ap are arranged without regularity, preferably randomly. However, these features are unnecessary when only the microbicidal activity of the synthetic polymer film 34A is pursued. For example, the raised portions 34Ap do not need to be densely arranged. The raised portions 34Ap may be regularly arranged. Note that, however, the shape and arrangement of the raised portions 34Ap are preferably selected such that the raised portions 34Ap effectively act on microorganisms.

A film 50B shown in FIG. 1B includes a base film 42B and a synthetic polymer film 34B provided on the base film 42B. The synthetic polymer film 34B has a plurality of raised portions 34Bp over its surface. The plurality of raised portions 34Bp constitute a moth-eye structure. In the film 50B, the configuration of the raised portions 34Bp of the synthetic polymer film 34B is different from that of the raised portions 34Ap of the synthetic polymer film 34A of the film 50A. Descriptions of features which are common with those of the film 50A are sometimes omitted.

When viewed in a normal direction of the synthetic polymer film 34B, the two-dimensional size of the raised portions 34Bp, $D_p$, is in the range of more than 20 nm and less than 500 nm. The typical adjoining distance of the raised portions 34Bp, $D_{int}$, is more than 20 nm and not more than 1000 nm, and $D_p<D_{int}$ holds. That is, in the synthetic polymer film 34B, there is a flat portion between adjoining raised portions 34Bp. The raised portions 34Bp have the shape of a cylinder with a conical portion on the air side. The typical height of the raised portions 34Bp, $D_h$, is not less than 50 nm and less than 500 nm. The raised portions 34Bp may be arranged regularly or may be arranged irregularly. When the raised portions 34Bp are arranged regularly, $D_{int}$ also represents the period of the arrangement. This also applies to the synthetic polymer film 34A, as a matter of course.

In this specification, the "moth-eye structure" includes not only surficial nanostructures that have an excellent antireflection function and that are formed by raised portions which have such a shape that the cross-sectional area (a cross section parallel to the film surface) increases as do the raised portions 34Ap of the synthetic polymer film 34A shown in FIG. 1A but also surficial nanostructures that are formed by raised portions which have a part where the cross-sectional area (a cross section parallel to the film surface) is constant as do the raised portions 34Bp of the synthetic polymer film 34B shown in FIG. 1B. Note that, from the viewpoint of breaking the cell walls and/or cell membranes of microorganisms, providing a conical portion is preferred. Note that, however, the tip end of the conical shape does not necessarily need to be a surficial nanostructure but may have a rounded portion (about 60 nm) which is generally equal to the nanopillars which form surficial nanostructures of the wings of cicadas.

A mold for forming the moth-eye structure such as illustrated in FIG. 1A and FIG. 1B over the surface (hereinafter, referred to as "moth-eye mold") has an inverted moth-eye structure obtained by inverting the moth-eye structure. Using an anodized porous alumina layer which has the inverted moth-eye structure as a mold without any modification enables inexpensive production of the moth-eye structure. Particularly when a moth-eye mold in the shape of a hollow cylinder is used, the moth-eye structure can be efficiently manufactured according to a roll-to-roll method. Such a moth-eye mold can be manufactured according to methods described in Japanese Laid-Open Patent Publication No. 2009-166502, WO 2011/125486 and WO 2013/183576.

A manufacturing method of a moth-eye mold 100A that is for production of the synthetic polymer film 34A is described with reference to FIG. 2A, FIG. 2B, FIG. 2C, FIG. 2D, and FIG. 2E.

Figure 2A:
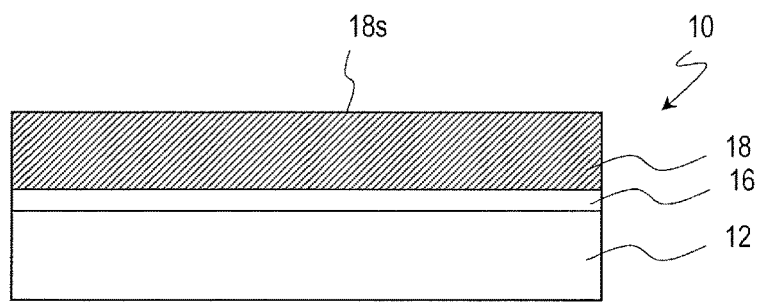
FIG. 2A, FIG. 2B, FIG. 2C, FIG. 2D, and FIG. 2E are diagrams for illustrating a method for manufacturing a moth-eye mold 100A and a configuration of the moth-eye mold 100A.

Firstly, a mold base 10 is provided which includes an aluminum base 12, an inorganic material layer 16 provided on a surface of the aluminum base 12, and an aluminum film 18 deposited on the inorganic material layer 16 as shown in FIG. 2A.

The aluminum base 12 used may be an aluminum base whose aluminum purity is not less than 99.50 mass % and less than 99.99 mass % and which has relatively high rigidity. The impurity contained in the aluminum base 12 may preferably include at least one element selected from the group consisting of iron (Fe), silicon (Si), copper (Cu), manganese (Mn), zinc (Zn), nickel (Ni), titanium (Ti), lead (Pb), tin (Sn) and magnesium (Mg). Particularly, Mg is preferred. Since the mechanism of formation of pits (hollows) in the etching step is a local cell reaction, the aluminum base 12 ideally does not contain any element which is nobler than aluminum. It is preferred that the aluminum base 12 used contains, as the impurity element, Mg (standard electrode potential: −2.36 V) which is a base metal. If the content of an element nobler than aluminum is 10 ppm or less, it can be said in terms of electrochemistry that the aluminum base 12 does not substantially contain the element. The Mg content is preferably 0.1 mass % or more of the whole. It is, more preferably, in the range of not more than about 3.0 mass %. If the Mg content is less than 0.1 mass %, sufficient rigidity cannot be obtained. On the other hand, as the Mg content increases, segregation of Mg is more likely to occur. Even if the segregation occurs near a surface over which a moth-eye mold is to be formed, it would not be detrimental in terms of electrochemistry but would be a cause of a defect because Mg forms an anodized film of a different form from that of aluminum. The content of the impurity element may be appropriately determined depending on the shape, thickness, and size of the aluminum base 12, in view of required rigidity. For example, when the aluminum base 12 in the form of a plate is prepared by rolling, the appropriate Mg content is about 3.0 mass %. When the aluminum base 12 having a three-dimensional structure of, for example, a hollow cylinder is prepared by extrusion, the Mg content is preferably 2.0 mass % or less. If the Mg content exceeds 2.0 mass %, the extrudability deteriorates in general.

The aluminum base 12 used may be an aluminum pipe in the shape of a hollow cylinder which is made of, for example, JIS A1050, an Al—Mg based alloy (e.g., JIS A5052), or an Al—Mg—Si based alloy (e.g., JIS A6063).

The surface of the aluminum base 12 is preferably a surface cut with a bit. If, for example, abrasive particles are remaining on the surface of the aluminum base 12, conduction will readily occur between the aluminum film 18 and the aluminum base 12 in a portion in which the abrasive particles are present. Not only in the portion in which the abrasive particles are remaining but also in a portion which has a roughened surface, conduction is likely to occur locally between the aluminum film 18 and the aluminum base 12. When conduction occurs locally between the aluminum film 18 and the aluminum base 12, there is a probability that a local cell reaction will occur between an impurity in the aluminum base 12 and the aluminum film 18.

The material of the inorganic material layer 16 may be, for example, tantalum oxide ($Ta_2O_5$) or silicon dioxide ($SiO_2$). The inorganic material layer 16 can be formed by, for example, sputtering. When a tantalum oxide layer is used as the inorganic material layer 16, the thickness of the tantalum oxide layer is, for example, 200 nm.

The thickness of the inorganic material layer 16 is preferably not less than 100 nm and less than 500 nm. If the thickness of the inorganic material layer 16 is less than 100 nm, there is a probability that a defect (typically, a void; i.e., a gap between crystal grains) occurs in the aluminum film 18. If the thickness of the inorganic material layer 16 is not less than 500 nm, insulation is likely to occur between the aluminum base 12 and the aluminum film 18 due to the surface condition of the aluminum base 12. To realize anodization of the aluminum film 18 by supplying an electric current from the aluminum base 12 side to the aluminum film 18, the electric current needs to flow between the aluminum base 12 and the aluminum film 18. When employing a configuration where an electric current is supplied from the inside surface of the aluminum base 12 in the shape of a hollow cylinder, it is not necessary to provide an electrode to the aluminum film 18. Therefore, the aluminum film 18 can be anodized across the entire surface, while such a problem does not occur that supply of the electric current becomes more difficult as the anodization advances. Thus, the aluminum film 18 can be anodized uniformly across the entire surface.

To form a thick inorganic material layer 16, it is in general necessary to increase the film formation duration. When the film formation duration is increased, the surface temperature of the aluminum base 12 unnecessarily increases, and as a result, the film quality of the aluminum film 18 deteriorates, and a defect (typically, a void) occurs in some cases. When the thickness of the inorganic material layer 16 is less than 500 nm, occurrence of such a problem can be suppressed.

The aluminum film 18 is, for example, a film which is made of aluminum whose purity is not less than 99.99 mass % (hereinafter, also referred to as "high-purity aluminum film") as described in WO 2011/125486. The aluminum film 18 is formed by, for example, vacuum evaporation or sputtering. The thickness of the aluminum film 18 is preferably in the range of not less than about 500 nm and not more than about 1500 nm. For example, the thickness of the aluminum film 18 is about 1 μm.

The aluminum film 18 may be an aluminum alloy film described in WO 2013/183576 in substitution for the high-purity aluminum film. The aluminum alloy film described in WO 2013/183576 contains aluminum, a metal element other than aluminum, and nitrogen. In this specification, the "aluminum film" includes not only the high-purity aluminum film but also the aluminum alloy film described in WO 2013/183576.

Using the above-described aluminum alloy film can realize a specular surface whose reflectance is not less than 80%. The average grain diameter of crystal grains that form the aluminum alloy film when viewed in the normal direction of the aluminum alloy film is, for example, not more than 100 nm, and that the maximum surface roughness Rmax of the aluminum alloy film is not more than 60 nm. The content of nitrogen in the aluminum alloy film is, for example, not less than 0.5 mass % and not more than 5.7 mass %. It is preferred that the absolute value of the difference between the standard electrode potential of the metal element other than aluminum which is contained in the aluminum alloy film and the standard electrode potential of aluminum is not more than 0.64 V, and that the content of the metal element in the aluminum alloy film is not less than 1.0 mass % and not more than 1.9 mass %. The metal element is, for example, Ti or Nd. The metal element is not limited to these examples but may be such a different metal element that the absolute value of the difference between the standard electrode potential of the metal element and the standard electrode potential of aluminum is not more than 0.64 V (for example, Mn, Mg, Zr, V, and Pb). Further, the metal element may be Mo, Nb, or Hf. The aluminum alloy film may contain two or more of these metal elements. The aluminum alloy film is formed by, for example, a DC magnetron sputtering method. The thickness of the aluminum alloy film is also preferably in the range of not less than about 500 nm and not more than about 1500 nm. For example, the thickness of the aluminum alloy film is about 1 μm.

Figure 2B:
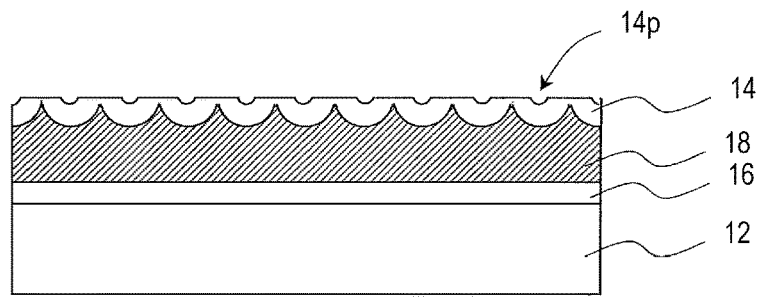

Then, a surface 18s of the aluminum film 18 is anodized to form a porous alumina layer 14 which has a plurality of recessed portions (micropores) 14p as shown in FIG. 2B. The porous alumina layer 14 includes a porous layer which has the recessed portions 14p and a barrier layer (the base of the recessed portions (micropores) 14p). As known in the art, the interval between adjacent recessed portions 14p (the distance between the centers) is approximately twice the thickness of the barrier layer and is approximately proportional to the voltage that is applied during the anodization. This relationship also applies to the final porous alumina layer 14 shown in FIG. 2E.

The porous alumina layer 14 is formed by, for example, anodizing the surface 18s in an acidic electrolytic solution. The electrolytic solution used in the step of forming the porous alumina layer 14 is, for example, an aqueous solution which contains an acid selected from the group consisting of oxalic acid, tartaric acid, phosphoric acid, sulfuric acid, chromic acid, citric acid, and malic acid. For example, the surface 18s of the aluminum film 18 is anodized with an applied voltage of 80 V for 55 seconds using an oxalic acid aqueous solution (concentration: 0.3 mass %, solution temperature: 10° C.), whereby the porous alumina layer 14 is formed.

Figure 2C:
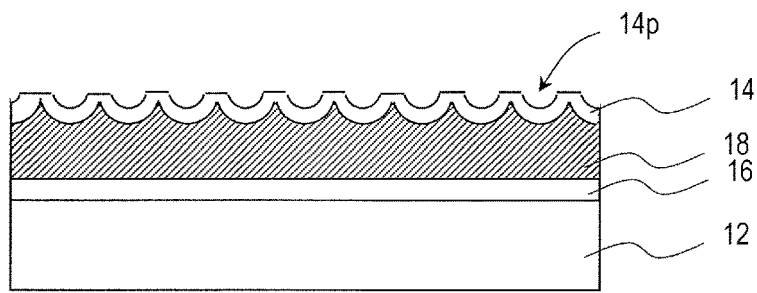

Then, the porous alumina layer 14 is brought into contact with an alumina etchant such that a predetermined amount is etched away, whereby the opening of the recessed portions 14p is enlarged as shown in FIG. 2C. By modifying the type and concentration of the etching solution and the etching duration, the etching amount (i.e., the size and depth of the recessed portions 14p) can be controlled. The etching solution used may be, for example, an aqueous solution of 10 mass % phosphoric acid, organic acid such as formic acid, acetic acid or citric acid, or sulfuric acid, or a chromic/phosphoric acid solution. For example, the etching is performed for 20 minutes using a phosphoric acid aqueous solution (10 mass %, 30° C.)

Figure 2D:
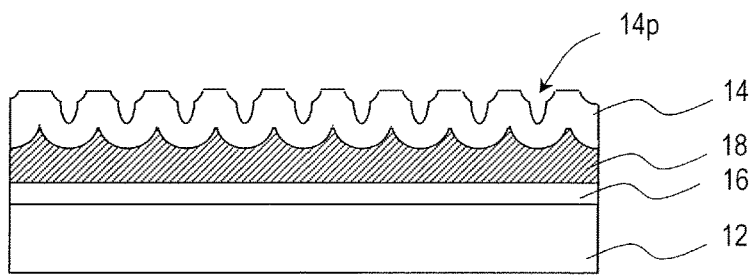

Then, the aluminum film 18 is again partially anodized such that the recessed portions 14p are grown in the depth direction and the thickness of the porous alumina layer 14 is increased as shown in FIG. 2D. Here, the growth of the recessed portions 14p starts at the bottoms of the previously-formed recessed portions 14p, and accordingly, the lateral surfaces of the recessed portions 14p have stepped shapes.

Thereafter, when necessary, the porous alumina layer 14 may be brought into contact with an alumina etchant to be further etched such that the pore diameter of the recessed portions 14p is further increased. The etching solution used in this step may preferably be the above-described etching solution. Practically, the same etching bath may be used.

Figure 2E:
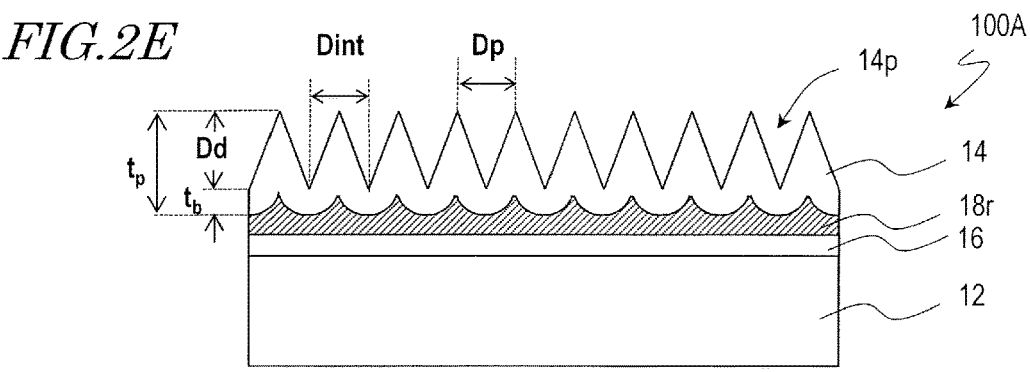

In this way, by alternately repeating the anodization step and the etching step as described above through multiple cycles (e.g., 5 cycles: including 5 anodization cycles and 4 etching cycles), the moth-eye mold 100A that includes the porous alumina layer 14 which has the inverted moth-eye structure is obtained as shown in FIG. 2E. Since the process is ended with the anodization step, the recessed portions 14p have pointed bottom portion. That is, the resultant mold enables formation of raised portions with pointed tip ends.

The porous alumina layer 14 (thickness: $t_p$) shown in FIG. 2E includes a porous layer (whose thickness is equivalent to the depth $D_d$ of the recessed portions 14p) and a barrier layer (thickness: $t_b$). Since the porous alumina layer 14 has a structure obtained by inverting the moth-eye structure of the synthetic polymer film 34A, corresponding parameters which define the dimensions may sometimes be designated by the same symbols.

The recessed portions 14p of the porous alumina layer 14 may have, for example, a conical shape and may have a stepped lateral surface. It is preferred that the two-dimensional size of the recessed portions 14p (the diameter of a circle equivalent to the area of the recessed portions 14p when viewed in a normal direction of the surface), $D_p$, is more than 20 nm and less than 500 nm, and the depth of the recessed portions 14p, $D_d$, is not less than 50 nm and less than 1000 nm (1 μm). It is also preferred that the bottom portion of the recessed portions 14p is acute (with the deepest part of the bottom portion being pointed). When the recessed portions 14p are in a densely packed arrangement, assuming that the shape of the recessed portions 14p when viewed in a normal direction of the porous alumina layer 14 is a circle, adjacent circles overlap each other, and a saddle portion is formed between adjacent ones of the recessed portions 14p. Note that, when the generally-conical recessed portions 14p adjoin one another so as to form saddle portions, the two-dimensional size of the recessed portions 14p, $D_p$, is equal to the adjoining distance $D_{int}$. The thickness of the porous alumina layer 14, $t_p$, is not more than about 1 μm.

Under the porous alumina layer 14 shown in FIG. 2E, there is an aluminum remnant layer 18r. The aluminum remnant layer 18r is part of the aluminum film 18 which has not been anodized. When necessary, the aluminum film 18 may be substantially thoroughly anodized such that the aluminum remnant layer 18r is not present. For example, when the inorganic material layer 16 has a small thickness, it is possible to readily supply an electric current from the aluminum base 12 side.

The manufacturing method of the moth-eye mold illustrated herein enables manufacture of a mold which is for production of antireflection films described in Japanese Laid-Open Patent Publication No. 2009-166502, WO 2011/125486 and WO 2013/183576. Since an antireflection film used in a high-definition display panel is required to have high uniformity, selection of the material of the aluminum base, specular working of the aluminum base, and control of the purity and components of the aluminum film are preferably carried out as described above. However, the above-described mold manufacturing method can be simplified because the microbicidal activity can be achieved without high uniformity. For example, the surface of the aluminum base may be directly anodized. Even if, in this case, pits are formed due to impurities contained in the aluminum base, only local structural irregularities occur in the moth-eye structure of the finally-obtained synthetic polymer film 34A, and it is estimated that there is little adverse influence on the microbicidal activity.

According to the above-described mold manufacturing method, a mold in which the regularity of the arrangement of the recessed portions is low, and which is suitable to production of an antireflection film, can be manufactured. In the case of utilizing the microbicidal ability of the moth-eye structure, it is estimated that the regularity of the arrangement of the raised portions does not exert an influence. A mold for formation of a moth-eye structure which has regularly-arranged raised portions can be manufactured, for example, as described in the following section.

For example, after formation of a porous alumina layer having a thickness of about 10 μm, the formed porous alumina layer is removed by etching, and then, anodization may be performed under the conditions for formation of the above-described porous alumina layer. A 10 μm thick porous alumina layer is realized by extending the anodization duration. When such a relatively thick porous alumina layer is formed and then this porous alumina layer is removed, a porous alumina layer having regularly-arranged recessed portions can be formed without being influenced by irregularities which are attributed to grains that are present at the surface of an aluminum film or aluminum base or the process strain. Note that, in removal of the porous alumina layer, using a chromic/phosphoric acid solution is preferred. Although continuing the etching for a long period of time sometimes causes galvanic corrosion, the chromic/phosphoric acid solution has the effect of suppressing galvanic corrosion.

A moth-eye mold for production of the synthetic polymer film 34B shown in FIG. 1B can be, basically, manufactured by combination of the above-described anodization step and etching step. A manufacturing method of a moth-eye mold 100B that is for production of the synthetic polymer film 34B is described with reference to FIG. 3A, FIG. 3B, and FIG. 3C.

Firstly, in the same way as illustrated with reference to FIG. 2A and FIG. 2B, the mold base 10 is provided, and the surface 18s of the aluminum film 18 is anodized, whereby a porous alumina layer 14 which has a plurality of recessed portions (micropores) 14p is formed.

Figure 3A:
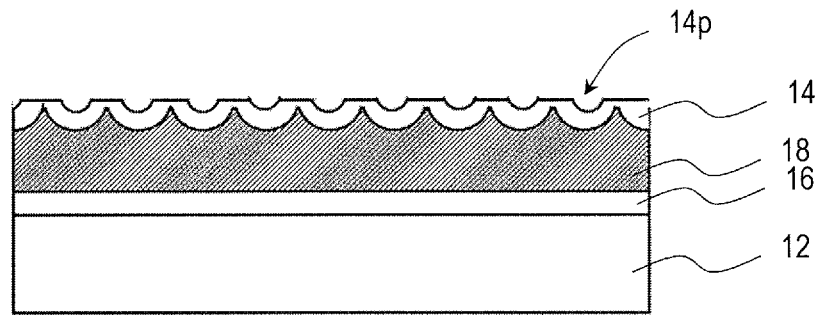
FIG. 3A, FIG. 3B, and FIG. 3C are diagrams for illustrating a method for manufacturing a moth-eye mold 100B and a configuration of the moth-eye mold 100B.

Then, the porous alumina layer 14 is brought into contact with an alumina etchant such that a predetermined amount is etched away, whereby the opening of the recessed portions 14p is enlarged as shown in FIG. 3A. In this step, the etched amount is smaller than in the etching step illustrated with reference to FIG. 2C. That is, the size of the opening of the recessed portions 14p is decreased. For example, the etching is performed for 10 minutes using a phosphoric acid aqueous solution (10 mass %, 30° C.)

Figure 3B:
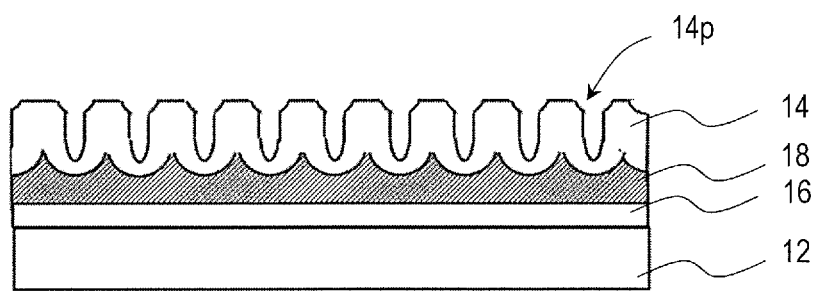

Then, the aluminum film 18 is again partially anodized such that the recessed portions 14p are grown in the depth direction and the thickness of the porous alumina layer 14 is increased as shown in FIG. 3B. In this step, the recessed portions 14p are grown deeper than in the anodization step illustrated with reference to FIG. 2D. For example, the anodization is carried out with an applied voltage of 80 V for 165 seconds (in FIG. 2D, 55 seconds) using an oxalic acid aqueous solution (concentration: 0.3 mass %, solution temperature: 10° C.)

Figure 3C:
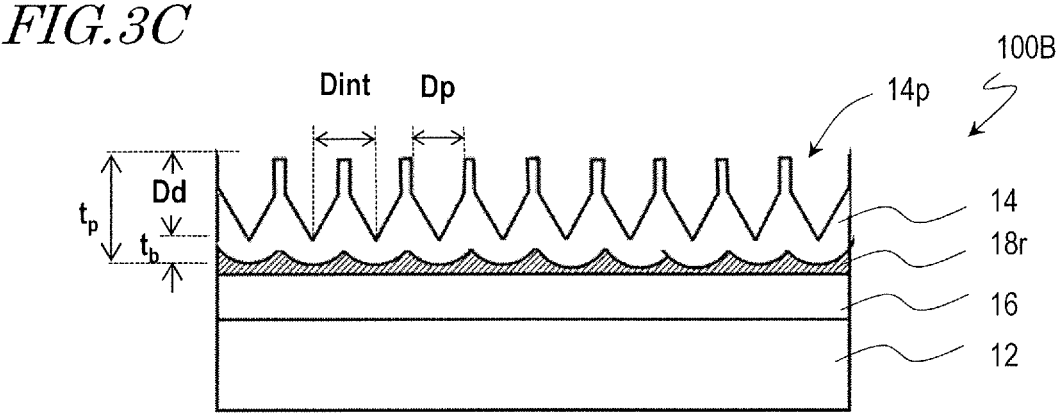

Thereafter, the etching step and the anodization step are alternately repeated through multiple cycles in the same way as illustrated with reference to FIG. 2E. For example, 3 cycles of the etching step and 3 cycles of the anodization step are alternately repeated, whereby the moth-eye mold 100B including the porous alumina layer 14 which has the inverted moth-eye structure is obtained as shown in FIG. 3C. In this step, the two-dimensional size of the recessed portions 14p, $D_p$, is smaller than the adjoining distance $D_{int}$ ($D_p < D_{int}$).

The size of the microorganisms varies depending on their types. For example, the size of *P. aeruginosa* is about 1 µm. However, the size of the bacteria ranges from several hundreds of nanometers to about five micrometers. The size of fungi is not less than several micrometers. For example, it is estimated that raised portions whose two-dimensional size is about 200 nm have a microbicidal activity on a microorganism whose size is not less than about 0.5 µm, but there is a probability that the raised portions are too large to exhibit a sufficient microbicidal activity on a bacterium whose size is several hundreds of nanometers. The size of viruses ranges from several tens of nanometers to several hundreds of nanometers, and many of them have a size of not more than 100 nm. Note that viruses do not have a cell membrane but have a protein shell called capsid which encloses virus nucleic acids. The viruses can be classified into those which have a membrane-like envelope outside the shell and those which do not have such an envelope. In the viruses which have an envelope, the envelope is mainly made of a lipid. Therefore, it is expected that the raised portions likewise act on the envelope. Examples of the viruses which have an envelope include influenza virus and Ebola virus. In the viruses which do not have an envelope, it is expected that the raised portions likewise act on this protein shell called capsid. When the raised portions include nitrogen element, the raised portions can have an increased affinity for a protein which is made of amino acids.

In view of the above, the configuration and production method of a synthetic polymer film having raised portions which can exhibit a microbicidal activity against a microorganism of not more than several hundreds of nanometers are described below.

In the following description, raised portions of the above-described synthetic polymer film which have a two-dimensional size in the range of more than 20 nm and less than 500 nm are referred to as "first raised portions". Raised portions which are superimposedly formed over the first raised portions are referred to as "second raised portions". The two-dimensional size of the second raised portions is smaller than the two-dimensional size of the first raised portions and does not exceed 100 nm. Note that when the two-dimensional size of the first raised portions is less than 100 nm, particularly less than 50 nm, it is not necessary to provide the second raised portions. Recessed portions of the mold corresponding to the first raised portions are referred to as "first recessed portions", and recessed portions of the mold corresponding to the second raised portions are referred to as "second recessed portions".

When the method of forming the first recessed portions which have predetermined size and shape by alternately performing the anodization step and the etching step as described above is applied without any modification, the second recessed portions cannot be formed successfully.

Figure 4A:
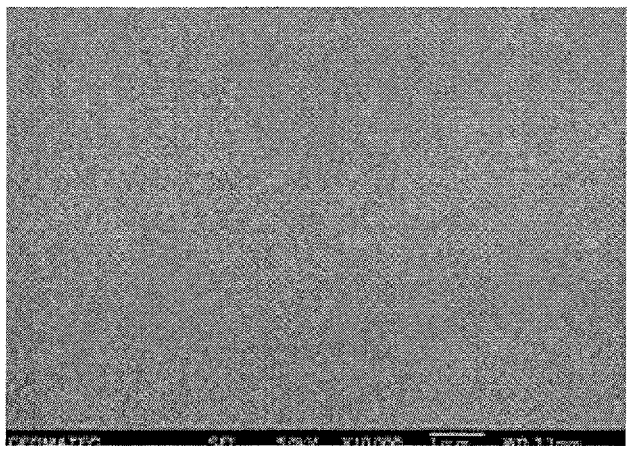
FIG. 4A shows a SEM image of a surface of an aluminum base.
Figure 4B:
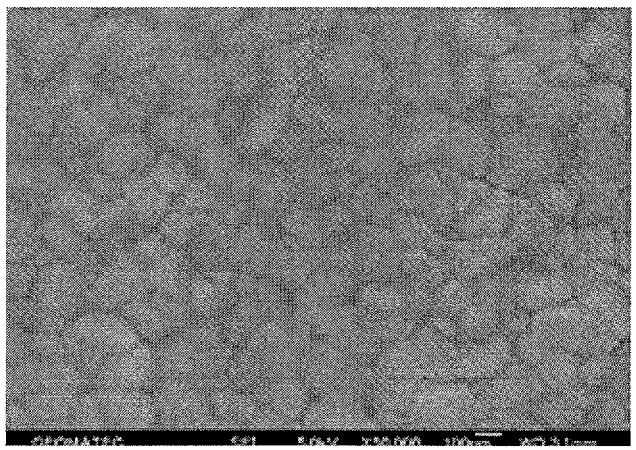
FIG. 4B shows a SEM image of a surface of an aluminum film.
Figure 4C:
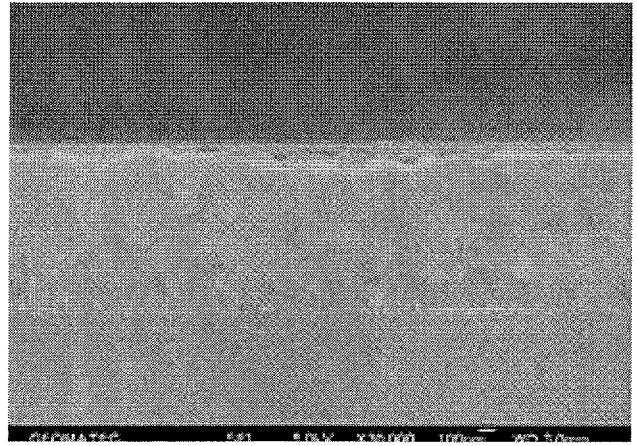
FIG. 4C shows a SEM image of a cross section of the aluminum film.

FIG. 4A shows a SEM image of a surface of an aluminum base (designated by reference numeral 12 in FIG. 2A). FIG. 4B shows a SEM image of a surface of an aluminum film (designated by reference numeral 18 in FIG. 2A). FIG. 4C shows a SEM image of a cross section of the aluminum film (designated by reference numeral 18 in FIG. 2A). As seen from these SEM images, there are grains (crystal grains) at the surface of the aluminum base and the surface of the aluminum film. The grains of the aluminum film form unevenness at the surface of the aluminum film. This unevenness at the surface affects formation of the recessed portions in the anodization and therefore interrupts formation of second recessed portions whose $D_p$ or $D_{int}$ is smaller than 100 nm.

In view of the above, a method for manufacturing a mold which is used in production of a synthetic polymer film according to an embodiment of the present invention includes: (a) providing an aluminum base or an aluminum film deposited on a support; (b) the anodization step of applying a voltage at the first level while a surface of the aluminum base or aluminum film is kept in contact with an electrolytic solution, thereby forming a porous alumina layer which has the first recessed portions; (c) after step (b), the etching step of bringing the porous alumina layer into contact with an etching solution, thereby enlarging the first recessed portions; and (d) after step (c), applying a voltage at the second level that is lower than the first level while the porous alumina layer is kept in contact with an electrolytic solution, thereby forming the second recessed portions in the first recessed portions. For example, the first level is higher than 40 V, and the second level is equal to or lower than 20 V.

Specifically, an anodization step is carried out with the voltage at the first level, whereby the first recessed portions are formed which have such a size that is not influenced by the grains of the aluminum base or aluminum film. Thereafter, the thickness of the barrier layer is decreased by etching, and then, another anodization step is carried out with the voltage at the second level that is lower than the first level, whereby the second recessed portions are formed in the first recessed portions. When the second recessed portions are formed through such a procedure, the influence of the grains is avoided.

Figure 5A:
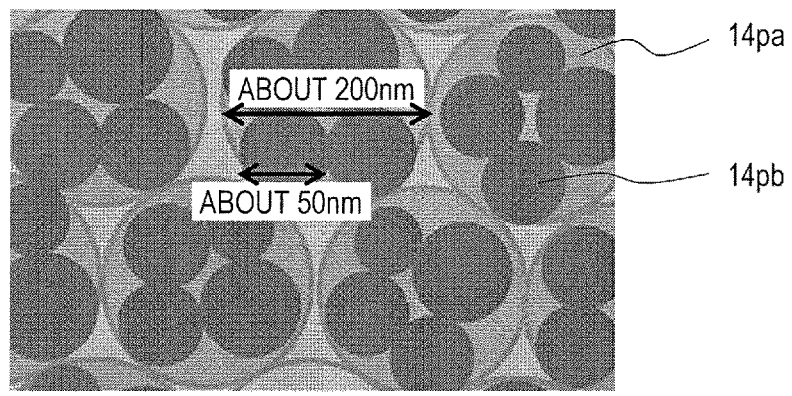
FIG. 5A is a schematic plan view of a porous alumina layer of a mold.
Figure 5B:
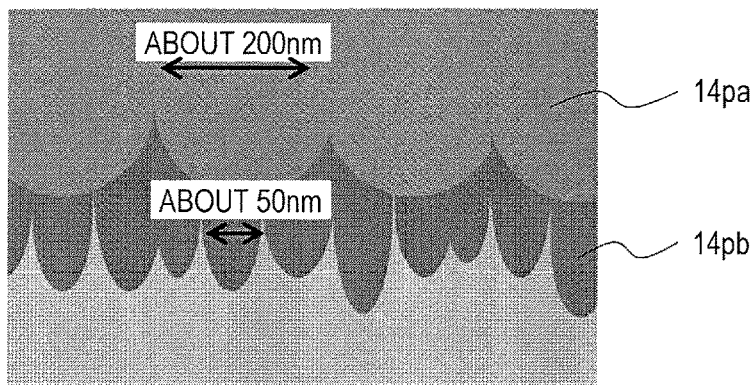
FIG. 5B is a schematic cross-sectional view of the porous alumina layer.
Figure 5C:
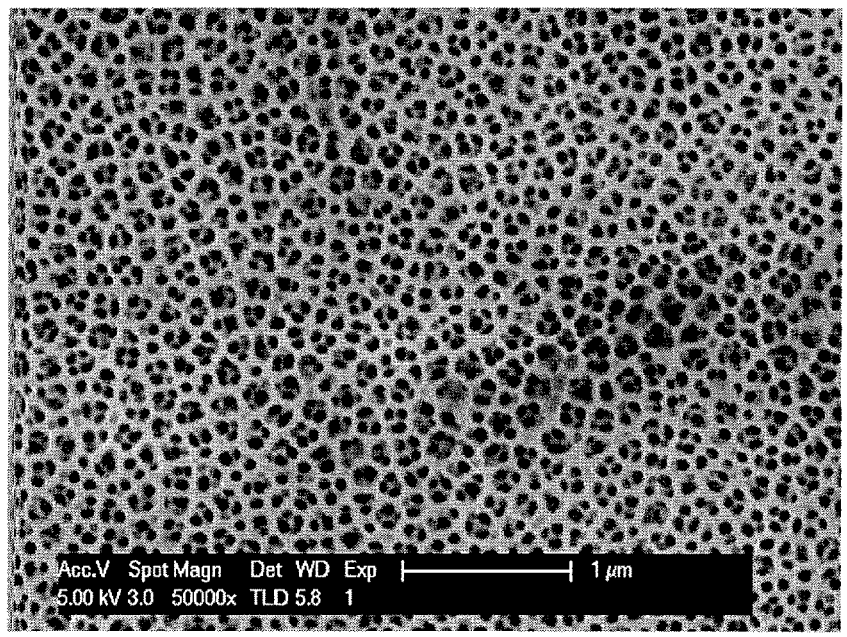
FIG. 5C is a SEM image of a prototype mold.

A mold which has first recessed portions 14$pa$ and second recessed portions 14$pb$ formed in the first recessed portions 14$pa$ is described with reference to FIG. 5A, FIG. 5B, and FIG. 5C. FIG. 5A is a schematic plan view of a porous alumina layer of a mold. FIG. 5B is a schematic cross-sectional view of the porous alumina layer. FIG. 5C shows a SEM image of a prototype mold.

As shown in FIG. 5A and FIG. 5B, the surface of the mold of the present embodiment has the plurality of first recessed portions 14$pa$ whose two-dimensional size is in the range of more than 20 nm and less than 500 nm and the plurality of second recessed portions 14$pb$ which are superimposedly formed over the plurality of first recessed portions 14$pa$. The two-dimensional size of the plurality of second recessed portions 14$pb$ is smaller than the two-dimensional size of the plurality of first recessed portions 14$pa$ and does not exceed 100 nm. The height of the second recessed portions 14$pb$ is, for example, more than 20 nm and not more than 100 nm. The second recessed portions 14$pb$ preferably have a generally conical portion as do the first recessed portions 14$pa$.

The porous alumina layer shown in FIG. 5C was formed as described below.

The aluminum film used was an aluminum film which contains Ti at 1 mass %. The anodization solution used was an oxalic acid aqueous solution (concentration: 0.3 mass %, solution temperature: 10° C.). The etching solution used was a phosphoric acid aqueous solution (concentration: 10 mass %, solution temperature: 30° C.). After the anodization was carried out with a voltage of 80 V for 52 seconds, the etching was carried out for 25 minutes. Then, the anodization was carried out with a voltage of 80 V for 52 seconds, and the etching was carried out for 25 minutes. Thereafter, the anodization was carried out with a voltage of 20 V for 52 seconds, and the etching was carried out for 5 minutes. Further, the anodization was carried out with a voltage of 20 V for 52 seconds.

As seen from FIG. 5C, the second recessed portions whose $D_p$ was about 50 nm were formed in the first recessed portions whose $D_p$ was about 200 nm. When in the above-described manufacturing method the voltage at the first level was changed from 80 V to 45 V for formation of the porous alumina layer, the second recessed portions whose $D_p$ was about 50 nm were formed in the first recessed portions whose $D_p$ was about 100 nm.

When a synthetic polymer film is produced using such a mold, the produced synthetic polymer film has raised portions whose configuration is the inverse of that of the first recessed portions 14$pa$ and the second recessed portions 14$pb$ shown in FIG. 5A and FIG. 5B. That is, the produced synthetic polymer film further includes a plurality of second raised portions superimposedly formed over a plurality of first raised portions.

The thus-produced synthetic polymer film which has the first raised portions and the second raised portions superimposedly formed over the first raised portions has a microbicidal activity on various microorganisms, ranging from relatively small microorganisms of about 100 nm to relatively large microorganisms of not less than 5 μm.

As a matter of course, only raised portions whose two-dimensional size is in the range of more than 20 nm and less than 100 nm may be formed according to the size of a target microorganism. The mold for formation of such raised portions can be manufactured, for example, as described below.

The anodization is carried out using a neutral salt aqueous solution (ammonium borate, ammonium citrate, etc.), such as an ammonium tartrate aqueous solution, or an organic acid which has a low ionic dissociation degree (maleic acid, malonic acid, phthalic acid, citric acid, tartaric acid, etc.) to form a barrier type anodized film. After the barrier type anodized film is removed by etching, the anodization is carried out with a predetermined voltage (the voltage at the second level described above), whereby recessed portions whose two-dimensional size is in the range of more than 20 nm and less than 100 nm can be formed.

For example, an aluminum film which contains Ti at 1 mass % is anodized at 100 V for 2 minutes using a tartaric acid aqueous solution (concentration: 0.1 mol/L, solution temperature: 23° C.), whereby a barrier type anodized film is formed. Thereafter, the etching is carried out for 25 minutes using a phosphoric acid aqueous solution (concentration: 10 mass %, solution temperature: 30° C.), whereby the barrier type anodized film is removed. Thereafter, the anodization and the etching are alternatively repeated as described above, specifically through 5 anodization cycles and 4 etching cycles. The anodization was carried out at 20 V for 52 seconds using an oxalic acid aqueous solution (concentration: 0.3 mass %, solution temperature: 10° C.) as the anodization solution. The etching was carried out for 5 minutes using the above-described etching solution. As a result, recessed portions whose two-dimensional size is about 50 nm can be uniformly formed.

Moth-eye molds which are capable of forming various moth-eye structures can be manufactured as described above.

Figure 6:
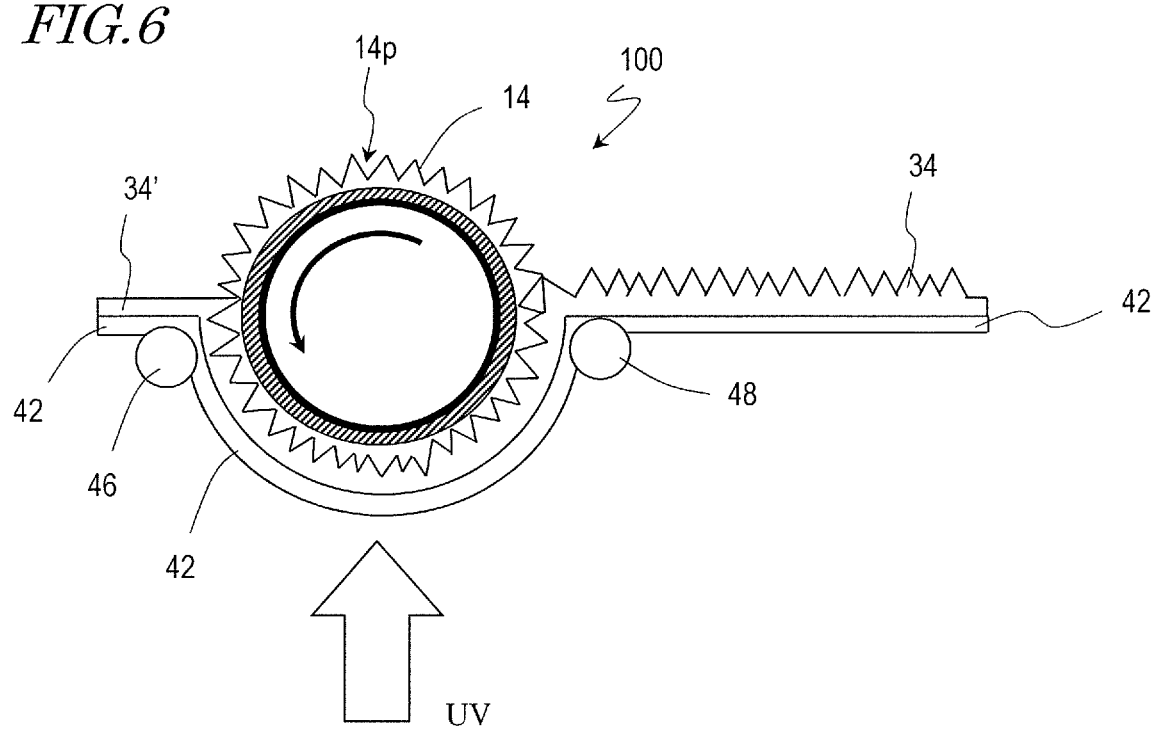
FIG. 6 is a diagram for illustrating a method for producing a synthetic polymer film with the use of the moth-eye mold 100.

Next, a method for producing a synthetic polymer film with the use of a moth-eye mold 100 is described with reference to FIG. 6. FIG. 6 is a schematic cross-sectional view for illustrating a method for producing a synthetic polymer film according to a roll-to-roll method. In the following paragraphs, a method for producing a synthetic polymer film over a surface of a base film as a work using the above-described roll mold will be described. However, a synthetic polymer film production method according to an embodiment of the present invention is not limited to this example but is capable of producing a synthetic polymer film over a surface of various types of works using a mold of a different shape.

First, a moth-eye mold 100 in the shape of a hollow cylinder is provided. Note that the moth-eye mold 100 in the shape of a hollow cylinder is manufactured according to, for example, the manufacturing method described with reference to FIG. 2A, FIG. 2B, FIG. 2C, FIG. 2D, and FIG. 2E.

As shown in FIG. 6, a base film 42 over which a UV-curable resin 34' is applied on its surface is maintained pressed against the moth-eye mold 100, and the UV-curable resin 34' is irradiated with ultraviolet (UV) light such that the UV-curable resin 34' is cured. The UV-curable resin 34' used may be, for example, an acrylic resin. The base film 42 may be, for example, a PET (polyethylene terephthalate) film or a TAC (triacetyl cellulose) film. The base film 42 is fed from an unshown feeder roller, and thereafter, the UV-curable resin 34' is applied over the surface of the base film 42 using, for example, a slit coater or the like. The base film 42 is supported by supporting rollers 46 and 48 as shown in FIG. 6. The supporting rollers 46 and 48 have rotation mechanisms for carrying the base film 42. The moth-eye mold 100 in the shape of a hollow cylinder is rotated at a rotation speed corresponding to the carrying speed of the base film 42 in a direction indicated by the arrow in FIG. 6.

Thereafter, the moth-eye mold 100 is separated from the base film 42, whereby a synthetic polymer film 34 to which the inverted moth-eye structure of the moth-eye mold 100 is transferred is formed on the surface of the base film 42. The base film 42 which has the synthetic polymer film 34 formed on the surface is wound up by an unshown winding roller.

The surface of the synthetic polymer film 34 has the moth-eye structure obtained by inverting the surficial nanostructures of the moth-eye mold 100. According to the surficial nanostructure of the moth-eye mold 100 used, the synthetic polymer films 34A and 34B shown in FIG. 1A and FIG. 1B, respectively, can be produced. The material that forms the synthetic polymer film 34 is not limited to the UV-curable resin but may be a photocurable resin which is curable by visible light.

The microbicidal ability of a synthetic polymer film which has the moth-eye structure over its surface has not only a correlation with the physical structure of the synthetic polymer film but also a correlation with the chemical properties of the synthetic polymer film. For example, the present applicant found correlations with chemical properties, such as a correlation with the contact angle of the surface of the synthetic polymer film (WO 2015/163018), a correlation with the concentration of the nitrogen element contained in the surface (WO 2016/080245), and a correlation with the content of ethylene oxide units ($—CH_2CH_2O—$) in addition to the nitrogen element concentration (WO 2016/208540).

Figure 7A:
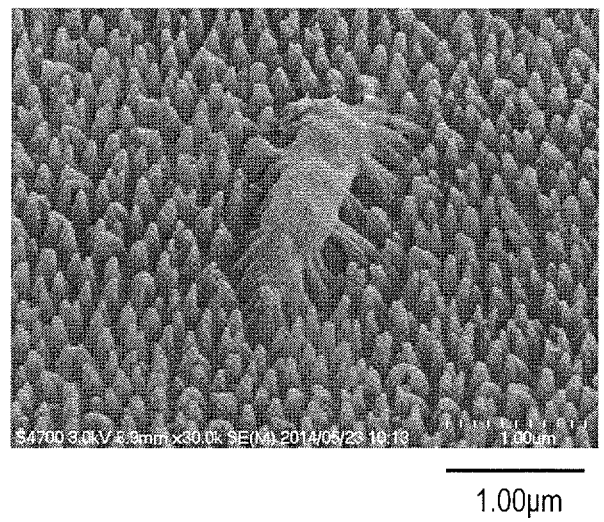
FIG. 7A and FIG. 7B show SEM images obtained by SEM (Scanning Electron Microscope) observation of a *P. aeruginosa* bacterium which died at a surface which had a moth-eye structure.
Figure 7B:
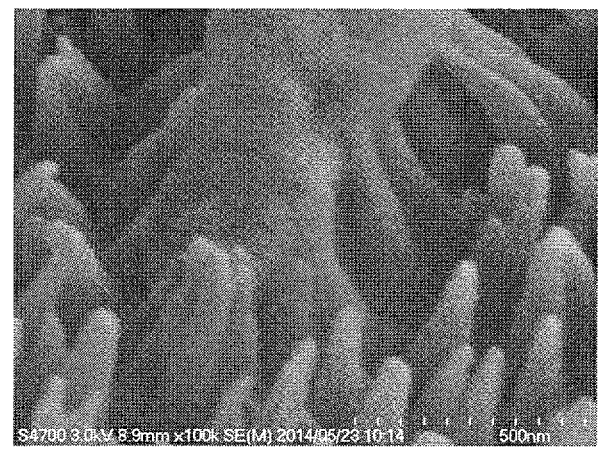

FIG. 7A and FIG. 7B show SEM images disclosed in WO 2016/080245 (FIG. 8). FIG. 7A and FIG. 7B show SEM images obtained by SEM (Scanning Electron Microscope) observation of a *P. aeruginosa* bacterium which died at the surface which had the moth-eye structure shown in FIG. 1A.

As seen from these SEM images, the tip end portions of the raised portions enter the cell wall (exine) of a *P. aeruginosa* bacterium. In FIG. 7A and FIG. 7B, the raised portions do not appear to break through the cell wall but appears to be taken into the cell wall. This might be explained by the mechanism suggested in the "Supplemental Information" section of Ivanova, E. P. et al. That is, it is estimated that the exine (lipid bilayer) of the Gram-negative bacteria came close to the raised portions and deformed so that the lipid bilayer locally underwent a transition like a first-order phase transition (spontaneous reorientation) and openings were formed in portions close to the raised portions, and the raised portions entered these openings. Alternatively, it is estimated that the raised portions were taken in due to the cell's mechanism of taking a polar substance (including a nutrient source) into the cell (endocytosis).

The present applicant found that, when a synthetic polymer film contains an organic carboxylic acid as described in Japanese Patent Application No. 2017-226887 of the present applicant, the microbicidal ability achieved by the surface which has the moth-eye structure improves. The organic carboxylic acid only needs to be contained in the synthetic polymer film. The photocurable resin may generate an organic carboxylic acid by photodecomposition. A compound which generates an organic carboxylic acid by photodecomposition may be an initiator (photopolymerization initiator) or may be a compound which does not function as an initiator (herein referred to as "photoacid generator"). When a radically-polymerizable photocurable resin is used as the photocurable resin, a photoacid generator which generates an organic carboxylic acid without generating a radical may be used. The entire disclosure of Japanese Patent Application No. 2017-226887 is incorporated by reference in this specification.

The organic carboxylic acid has a microbicidal ability (or antimicrobial ability) and is used as, for example, food preservatives. It is supposed that the organic carboxylic acid exhibits the microbicidal ability (antimicrobial ability) through various mechanisms. The mechanisms include (1) decreasing the pH in the environment; and (2) allowing undissociated acid to pass through a cell membrane such that the pH inside the cell decreases. In mechanism (2), a weaker acid (an acid having a smaller dissociation constant) contributes more greatly. See, for example, Rosa M. Raybaudi-Massilia et al., "Control of Pathogenic and Spoilage Microorganisms in Fresh-cut Fruits and Fruit Juices by Traditional and Alternative Natural Antimicrobials", COMPREHENSIVE REVIEWS IN FOOD SCIENCE AND FOOD SAFETY, Vol. 8, pp. 157-180, 2009 (particularly, p. 162).

As described in Japanese Patent Application No. 2017-226887 of the present applicant, it was found that the fast spreading of water dropped onto the surface of the synthetic polymer film advantageously affects the microbicidal ability. That is, it is preferred that the degree of spread of water (area equivalent circle diameter) is large. In this process, due to an acid extracted into water, the pH of the aqueous solution (water drop) decreases (becomes acidified) within a relatively short time period. A microbicidal activity which is attributed to this decrease of the pH effectively works. From the viewpoint of the microbicidal ability, for example, the area equivalent circle diameter of the aqueous solution at the lapse of 5 minutes since placing a 200 μL water drop on the surface of the synthetic polymer film is preferably not less than 20 mm. The pH of the aqueous solution at the lapse of 5 minutes since placing the water drop is preferably not more than 5. If the pH of the aqueous solution at the lapse of 5 minutes since placing the water drop is not more than 5, a microbicidal activity which is attributed to taking of an undissociated organic carboxylic acid into a cell effectively works.

The present inventors studied a synthetic polymer film which can be suitably used in, for example, uses for handling food. A synthetic polymer film of an embodiment of the present invention includes an antimicrobial additive which is permitted by law for use in food and which has an antimicrobial effect. Such an antimicrobial additive is, for example, an organic carboxylic acid. The organic carboxylic acid exhibits a microbicidal ability (or antimicrobial ability) through the above-described mechanism. It is not limited to the organic carboxylic acid but may be a substance which is known to have an antimicrobial effect (e.g., mustard extract, antifungal agent, or the like) and which is permitted by law for use in food.

In Japan, four types of additives described below are permitted for use in food. Note that, the Food Sanitation Act defines "additives" as "substances which are used by being added, mixed or infiltrated into food or by other methods in the process of producing food or for the purpose of processing or preserving food" (Article 4(2)).

(1) Designated Additives: Additives designated by the Minister of Health, Labour and Welfare based on the Food Sanitation Act, Article 10.

Designated Additives are listed in the Enforcement Regulations of the Food Sanitation Act, Appended Table 1 (also referred to as "List of Designated Additives").

(2) Existing Food Additives: Additives which were already broadly used in Japan when the Food Sanitation Act was revised (1995), including chemically synthesized compounds and natural products.

Existing Food Additives are listed in the "Table of Existing Food additives" which is stipulated in the Partial Amendments to the Food Sanitation Act and the Nutrition Improvement Act (Act No. 101 of 1995), Supplementary Provision, Article 2(4) (also referred to as "List of Existing Food Additives").

(3) Natural Flavoring Agents: Natural substances obtained from animals or plants or mixtures thereof which are used for flavoring food (Food Sanitation Act, Article 4(3)).

Natural Flavoring Agents are listed in, for example, Appendix 2 of the "Food Additive Labeling under the Food Sanitation Act" (Consumer Affairs Agency, Food Label Dep. Notification No. 377, 2010) dated Oct. 20, 2010 (also referred to as "List of Natural Flavoring Agents").

(4) Ordinary Foods Used as Food Additives: Substances which are generally provided as food and which are used as additives.

Ordinary Foods Used as Food Additives are listed in, for example, Appendix 3 of the "Food Additive Labeling under the Food Sanitation Act" (Consumer Affairs Agency, Food Label Dep. Notification No. 377, 2010) dated Oct. 20, 2010 (also referred to as "List of Ordinary Foods Used as Food Additives").

[Synthetic Polymer Film]

Sample films of Reference Examples 1 to 7, Examples 1 to 12 according to an embodiment of the present invention, and Comparative Examples 1 to 3 were produced. Each of the sample films (except for Reference Example 1) includes a base film and a synthetic polymer film formed on the base film. Reference Example 1 was a 50 μm thick PET film ("A4300" manufactured by TOYOBO CO., LTD.). The constituent materials used for a UV-curable resin for formation of the synthetic polymer films of respective sample films are shown in TABLE 1A and TABLE 1B.

TABLE 1A

| MATERIALS | Abbreviation | Product Name | Manufacturer Name | Compound Name | Remarks | Water Solubility | EO group | MW | Number of moles of EO | EO mass % | HLB value |
|---|---|---|---|---|---|---|---|---|---|---|---|
| Monomer | M280 | M280 | MIWON | polyethylene glycol (400) diacrylate | | YES | YES | 508 | 9 | 78 | |
| | M282 | M282 | MIWON | polyethylene glycol (200) diacrylate | | YES | YES | 308 | 4 | 57 | |
| | VEEA | VEEA | NIPPON SHOKUBAI CO., LTD. | 2-(2-vinyloxy-ethoxy)ethyl acrylate | | YES | YES | 200 | 2 | 44 | |
| | ACMO | ACMO | KJ Chemicals Corporation | N,N-acryloylmorpholine | | YES | NO | 99 | — | — | |
| Mold Releasing Agent | DL100 | POEM DL-100 | RIKEN VITAMIN CO., LTD. | diglycerol monolaurate (glycerol fatty acid ester) | Food Additive (Designated Additive) | — | unknown | — | — | — | 9.4 |
| | C250 | POEM C-250 | RIKEN VITAMIN CO., LTD. | sorbitan fatty acid ester | Food Additive (Designated Additive) | | | | | | 10.6 |
| Polymerization Initiator | 819 | IRGACURE 819 | IGM Resins | bis(2,4,6-trimethylbenzoyl)-phenylphosphine oxide | | — | — | — | — | — | |
| | TPO | IRGACURE TPO | IGM Resins | diphenyl(2,4,6-trimethyl-benzoyl)phosphine oxide | | — | — | — | — | — | |
| | OXE02 | IRGACURE OXE02 | BASF | ethanone,1-[9-ethyl-6-(2-methylbenzoyl)-9H-carbazol-3-yl]-,1-(O-acetyloxime) | | — | — | — | — | — | |
| | 127 | Omnirad 127 | IGM Resins | 2-hydroxy-1-{4-[4-(2-hydroxy-2-methyl-propionyl)-benzyl]-phenyl}-2-methyl-propan-1-one | | — | — | — | — | — | |

TABLE 1A-continued

| MATERIALS | Abbreviation | Product Name | Manufacturer Name | Compound Name | Remarks | Water Solubility | EO group | MW | Number of moles of EO | EO mass % | HLB value |
|---|---|---|---|---|---|---|---|---|---|---|---|
| | 2959 | Omnirad 2959 | IGM Resins | 1-[4-(2-hydroxyethoxy)-phenyl]-2-hydroxy-2-methyl-1-propane-1-one | | — | — | — | — | — | |

TABLE 1B

| MATERIALS | Abbreviation | Product Name | Manufacturer Name | Compound Name | Remarks | Water Solubility | EO group | MW | Number of moles of EO | EO mass % | HLB value |
|---|---|---|---|---|---|---|---|---|---|---|---|
| Additive | SA | succinic acid | NIPPON SHOKUBAI CO., LTD. | succinic acid | Food Additive (Designated Additive) | — | — | — | — | — | |
| | AA | adipic acid | SATUMA KAKO CO., LTD. | adipic acid | Food Additive (Designated Additive) | | | | | | |
| | MA | malic acid | Showa Kako Corp. | malic acid | Food Additive (Designated Additive) | | | | | | |
| | FC | phytic acid FC | FC CHEMICAL Co., Ltd. | phytic acid 50% aqueous solution | Food Additive (Existing Food Additive) | YES | — | — | — | — | |

The compositions of the synthetic polymer films of respective sample films are shown in TABLE 2 and TABLE 3. In Reference Examples 2 to 6 shown in TABLE 2 and Examples 5 to 10 and Comparative Examples 2 and 3 shown in TABLE 3, a resin composition prepared by further adding water was used. Since it is expected that water hardly remains in the synthetic polymer film, it is not included in the compositions shown in TABLE 2 and TABLE 3. In each case, the amount of the added water was 5 g for 48.5 g acrylic monomer M280. For example, for Reference Examples 2 to 6, the ingredients of the total composition including water (100%) were M280: 45.3%, M282: 45.3%, ACMO: 2.8%, polymerization initiator: 1.9% and water: 4.7%. The water used was distilled water manufactured by Wako Pure Chemical Corporation (manufacturer code: 041-16786).

As the base film 42, a 50 μm thick PET (polyethylene terephthalate) film ("A4300" manufactured by TOYOBO CO., LTD.), a 80 μm thick TAC (triacetyl cellulose) film ("TAC-TD80U" manufactured by FUJIFILM) or a 110 μm thick PC (polycarbonate) film ("Iupilon KS3410UR" manufactured by Mitsubishi Engineering-Plastics Corporation (Iupilon is a registered trademark)) was used.

Each of the sample films except for Comparative Example 1 was produced by the same method as that previously described with reference to FIG. 6 using a mold sample A or a mold sample B which will be described later as the mold sample. The sample film of Comparative Example 1 was formed using a glass plate as the mold sample. In each sample, the synthetic polymer film was produced without using a solvent with the exposure amount being about 200 mJ/cm$^2$ (on the basis of light at the wavelength of 375 nm).

In the ultraviolet light irradiation, a UV lamp manufactured by Fusion UV Systems (product name: LIGHT HANMAR6J6P3) was used.

The mold sample A has the similar configuration as that of the moth-eye mold 100A. For the moth-eye mold, an aluminum film (thickness: about 1 μm) was formed on a glass substrate (about 5 cm×about 5 cm), and anodization and etching were alternately and repeatedly performed on this aluminum film, whereby a porous alumina layer ($D_p$: about 200 nm, $D_{int}$: about 200 nm, $D_h$: about 150 nm) was formed. The sample films produced using the mold sample A (the sample films of Reference Examples 2 to 6, Examples 1 to 9 and Comparative Examples 2 and 3) have the similar configuration as that of the film 50A shown in FIG. 1A. That is, the sample films had a synthetic polymer film 34A which had a moth-eye structure over its surface, and in each sample film, $D_p$ was about 200 nm, $D_{int}$ was about 200 nm, and $D_h$ was about 150 nm.

The mold sample B has the similar configuration as that of a mold 100C which will be described later with reference to FIG. 8A. The sample films produced using the mold sample B (the sample films of Reference Example 7 and Examples 10 to 12) have the similar configuration as that of a film 50C which will be described later with reference to FIG. 8C. That is, the sample films had a synthetic polymer film 34C which had a plurality of recessed portions 34Cd over its surface, and in each sample film, the two-dimensional size of the plurality of recessed portions 34Cd was 740 nm.

When the PC film was used as the base film 42A (Examples 11 and 12 and Reference Example 7), UV-curable resins of respective compositions were applied to the mold sample while the mold sample was heated to 40° C. on a heat stage. On the mold sample to which the UV-curable resin was applied, the PC film was placed and evenly pressed against the mold sample using a hand roller. Then, the UV-curable resin was irradiated with ultraviolet light from the PC film side so as to be cured, whereby the sample film including the synthetic polymer film on the PC film was obtained. The process of producing the synthetic polymer film on the PC film is also referred to as "transfer process". The temperature in that process (40° C.) is also referred to as "transfer temperature".

TABLE 2

| | Monomer | | | Initiator | | | | Additive | Mold Sample | Two-dimensional Size (nm) | Base Film |
|---|---|---|---|---|---|---|---|---|---|---|---|
| | M280 | M282 | ACMO | 819 | TPO | OXE02 | 127 | 2959 Water | | | |
| Reference Example 1 | | | | | | | | | none | — | PET |
| Reference Example 2 | 47.5% | 47.5% | 2.9% | 2.0% | | | | added | Mold Sample A | 200 | PET |
| Reference Example 3 | 47.5% | 47.5% | 2.9% | | 2.0% | | | added | Mold Sample A | 200 | PET |
| Reference Example 4 | 47.5% | 47.5% | 2.9% | | | 2.0% | | added | Mold Sample A | 200 | PET |
| Reference Example 5 | 47.5% | 47.5% | 2.9% | | | | 2.0% | added | Mold Sample A | 200 | PET |
| Reference Example 6 | 47.5% | 47.5% | 2.9% | | | | | 2.0% added | Mold Sample A | 200 | PET |

TABLE 3

| | Monomer | | | | Initiator | | | Mold Releasing Agent | |
|---|---|---|---|---|---|---|---|---|---|
| | M280 | M282 | VEEA | ACMO | OXE02 | 127 | 2959 | DL100 | C250 |
| Comparative Example 1 | 94.6% | | | 2.9% | 2.0% | | | | |
| Example 1 | 94.6% | | | 2.9% | 2.0% | | | | |
| Example 2 | 93.7% | | | 2.9% | 1.9% | | | 1.0% | |
| Example 3 | 93.3% | | | 2.9% | 1.9% | | | 1.0% | |
| Example 4 | 92.8% | | | 2.9% | 1.9% | | | 1.0% | |
| Example 5 | 46.4% | 46.4% | | 2.9% | 1.9% | | | 1.0% | |
| Example 6 | 45.8% | 45.8% | | 2.8% | 1.9% | | | 0.9% | |
| Comparative Example 2 | 47.5% | 47.5% | | 2.9% | 2.0% | | | | |
| Comparative Example 3 | 47.1% | 47.1% | | 2.9% | 1.9% | | | 1.0% | |
| Example 7 | 45.8% | 45.8% | | 2.8% | 1.9% | | | 0.9% | |
| Example 8 | 45.8% | 45.8% | | 2.8% | 1.9% | | | 0.9% | |
| Example 9 | 46.0% | 46.0% | | 2.8% | 1.9% | | | 0.9% | |
| Example 10 | 46.0% | 46.0% | | 2.8% | 1.9% | | | 0.9% | |
| Reference Example 7 | 69.4% | 26.3% | | | | 1.9% | | | 1.0% |
| Example 11 | 69.4% | | 26.3% | | | 1.9% | | | 1.0% |
| Example 12 | 69.4% | | 26.3% | | | | 1.9% | | 1.0% |

| | Additive | | | | | Mold Sample | Two-dimensional Size (nm) | Base Film |
|---|---|---|---|---|---|---|---|---|
| | SA | AA | MA | FC | Water | | | |
| Comparative Example 1 | 0.5% | | | | | Glass Plate | — | TAC |
| Example 1 | 0.5% | | | | | Mold Sample A | 200 | TAC |
| Example 2 | 0.5% | | | | | Mold Sample A | 200 | TAC |
| Example 3 | 1.0% | | | | | Mold Sample A | 200 | TAC |
| Example 4 | 1.4% | | | | | Mold Sample A | 200 | TAC |

TABLE 3-continued

| | | | | | | |
|---|---|---|---|---|---|---|
| Example 5 | 1.4% | | | added | Mold Sample A | 200 | TAC |
| Example 6 | 2.8% | | | added | Mold Sample A | 200 | TAC |
| Comparative Example 2 | | | | added | Mold Sample A | 200 | TAC |
| Comparative Example 3 | | | | added | Mold Sample A | 200 | TAC |
| Example 7 | | 2.8% | | added | Mold Sample A | 200 | TAC |
| Example 8 | | | 2.8% | added | Mold Sample A | 200 | TAC |
| Example 9 | 1.4% | | | 0.9% added | Mold Sample A | 200 | TAC |
| Example 10 | 1.4% | | | 0.9% added | Mold Sample B | 740 | TAC |
| Reference Example 7 | 1.4% | | | | Mold Sample B | 740 | PC |
| Example 11 | 1.4% | | | | Mold Sample B | 740 | PC |
| Example 12 | 1.4% | | | | Mold Sample B | 740 | PC |

Now, the configurations of the mold sample B and the sample films produced using the mold sample B (Reference Example 7 and Examples 10 to 12) are described with reference to FIG. 8A, FIG. 8B and FIG. 8C. FIG. 8A is a schematic cross-sectional view of a mold 100C for formation of a synthetic polymer film 34C of an embodiment of the present invention. FIG. 8B is a schematic cross-sectional view for illustrating a method for producing the synthetic polymer film 34C using the mold 100C. FIG. 8C is a schematic cross-sectional view of a film 50C which includes the synthetic polymer film 34C. Features which are common with those of the film 50A are designated by the same reference numerals, and the descriptions thereof are sometimes omitted.

First, the mold 100C and a manufacturing method thereof are described with reference to FIG. 8A.

Figure 8A:
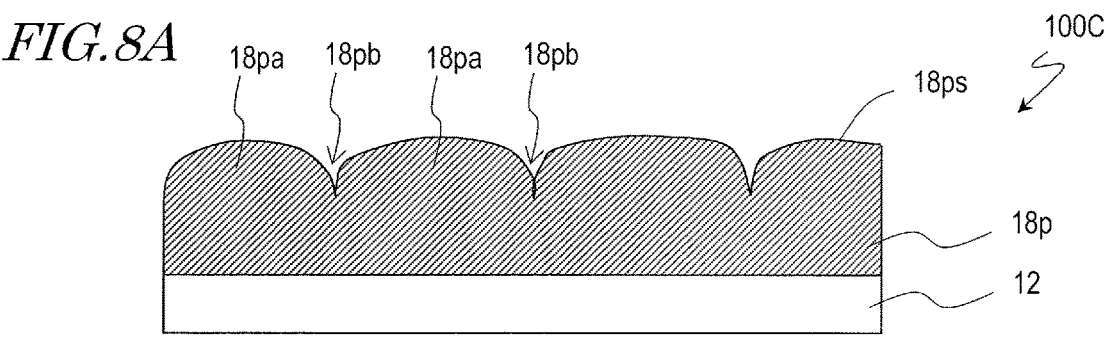
FIG. 8A is a schematic cross-sectional view of a mold 100C for formation of a synthetic polymer film 34C of another embodiment of the present invention.
Figure 8B:
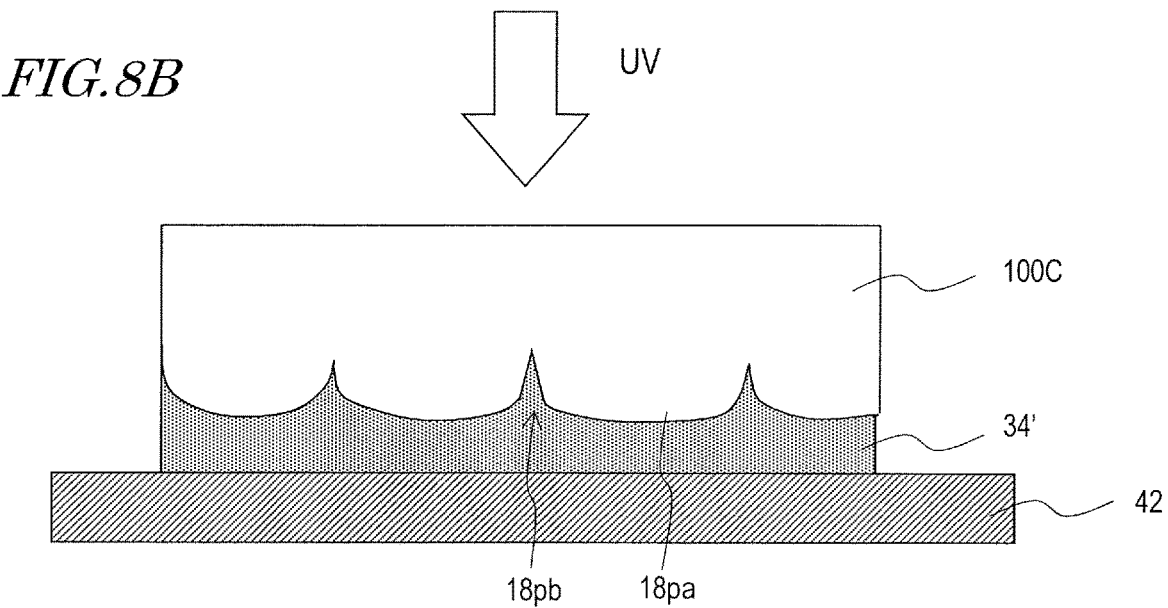
FIG. 8B is a schematic cross-sectional view for illustrating a method for producing the synthetic polymer film 34C using the mold 100C.
Figure 8C:
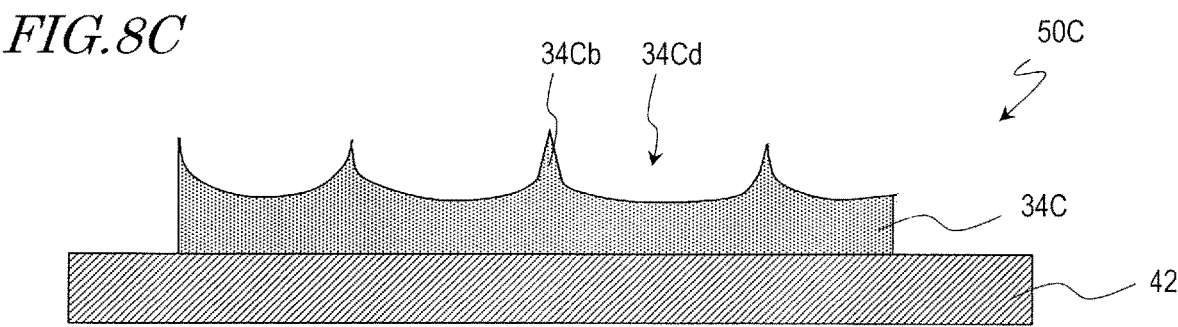
FIG. 8C is a schematic cross-sectional view of a film 50C which includes the synthetic polymer film 34C.

As shown in FIG. 8A, a mold 100C is obtained by forming an aluminum layer 18p on the base 12. The material of the base 12 may be an acid-resistant insulating material, such as, for example, glass, ceramic, plastic material, etc. Alternatively, the base 12 may be, for example, an aluminum base. Still alternatively, for example, the base 12 may be realized by applying an insulating material on a metal material other than aluminum. The surface of the base 12 may be, for example, any of a flat surface, a curved surface, and a roll surface. At a surface 18ps of the aluminum layer 18p, there are a plurality of crystal grains 18pa, the average crystal grain diameter of which is not less than 0.5 μm and not more than 3 μm. In FIG. 8A, grain boundaries 18pb which are present a the surface 18ps of the aluminum layer 18p are schematically shown. The aluminum layer 18p can be formed using, for example, a vacuum deposition method, such as sputtering and electron beam deposition. The surface of the mold 100C has a plurality of raised portions corresponding to the crystal grains 18pa. The gaps between adjoining raised portions correspond to the grain boundaries 18pb. In the example illustrated in the drawings, there is no flat portion between adjoining raised portions. The mold 100C has at its surface an uneven structure including a plurality of raised portions whose two-dimensional size is not less than 0.5 μm and not more than 3 μm. The mold 100C includes the aluminum layer 18p at its surface. The surface of the aluminum layer 18p has the above-described uneven structure.

The aluminum layer 18p is, for example, a high-purity aluminum layer. The high-purity aluminum layer 18p is made of, for example, aluminum whose purity is not less than 99.99 mass %. The thickness of the high-purity aluminum layer 18p is, for example, not less than 2 μm and not more than 6 μm.

The aluminum layer 18p may be, for example, an aluminum alloy layer which contains aluminum (Al) and titanium (Ti). The content of Ti in the aluminum alloy layer 18p is, for example, not less than 0.01 mass % and not more than 1 mass %. The thickness of the aluminum alloy layer 18p is, for example, not less than 4 μm and not more than 6 μm. When the thickness of the aluminum alloy layer 18p was less than 4 μm, crystal grains of a desired size were not formed in some cases.

The mold 100C may further include an inorganic underlayer (not shown) under the aluminum layer 18p. The inorganic underlayer can be made of, for example, an inorganic oxide or an inorganic nitride. For example, the inorganic underlayer is a silicon oxide layer, a tantalum oxide layer, a titanium oxide layer, or an AZO (aluminum-doped zinc oxide) layer. The thickness of the inorganic underlayer is, for example, not less than 50 nm and not more than 300 nm.

According to WO 2011/052652 of the present applicant, by adjusting the deposition conditions of an aluminum film which is to be formed on a substrate (e.g., glass substrate), the crystal grain diameter of a plurality of crystal grains at the surface of the aluminum film can be adjusted. For example, by adjusting the deposition conditions in forming an aluminum film of not less than 0.5 μm and not more than 5 μm in thickness, an aluminum film can be formed which has at the surface a plurality of crystal grains whose average crystal grain diameter is not less than 200 nm and not more than 5 μm. As described in WO 2016/084745 of the present applicant, by adjusting the composition and/or the deposition conditions (e.g., the thickness of the aluminum alloy layer) of the aluminum alloy layer which contains Al and Ti, the crystal grain diameter of a plurality of crystal grains at the surface of the aluminum alloy layer can be adjusted. When a porous alumina layer obtained by alternately performing anodization and etching on the thus-obtained aluminum alloy layer or aluminum film is used as the mold, an antireflection film which can perform an antiglare function can be formed. Note that, however, the mold 100C of an embodiment of the present invention was obtained without performing anodization or etching on a high-purity aluminum layer. The entire disclosures of WO 2011/052652 and WO 2016/084745 are incorporated by reference in this specification.

The shape of the uneven structure at the surface of the mold 100C can be changed by a way other than adjusting the deposition conditions for the aluminum layer (high-purity aluminum layer or aluminum alloy layer) 18p. For example, by forming an inorganic underlayer under the aluminum layer 18p, the surface shape of the inorganic underlayer can be reflected in the surface of the aluminum layer 18p. Further, by bringing the surface of the inorganic underlayer into contact with an etchant, the depth (height) of the uneven structure at the surface of the inorganic underlayer may be increased. Alternatively, by bringing the surface of the aluminum layer 18p into contact with an etchant, the depth (height) of the uneven structure at the surface of the aluminum layer 18p can be increased. For example, the etching is performed for 50 minutes or more using a phosphoric acid aqueous solution (10 mass %, 30° C.). These methods may be used together as a matter of course. When the shape of the uneven structure at the surface of the mold 100C is thus adjusted by a way other than adjusting the deposition conditions for the aluminum layer 18p, the thickness of the aluminum layer 18p may be smaller than the above-described range. For example, the thickness of the high-purity aluminum layer 18p may be not less than 1 μm and less than 2 μm. The thickness of the aluminum alloy layer 18p may be not less than 1 μm and less than 4 μm. If the thickness of the aluminum layer (high-purity aluminum layer or aluminum alloy layer) 18p is large, the grain boundaries 18pb are deep so that the transferability can deteriorate. When an inorganic underlayer is provided under the aluminum layer 18p, the thickness of the aluminum layer 18p can be reduced and, therefore, excellent transferability can advantageously be achieved.

The aluminum layer 18p may have a layered structure which includes a high-purity aluminum layer and an aluminum alloy layer. In this case, it is preferred that the thickness of the high-purity aluminum layer is not less than 1 μm. It is also preferred that the mold 100C includes a high-purity aluminum layer at the surface of the mold 100C. That is, it is preferred that a high-purity aluminum layer is provided on the aluminum alloy layer.

A synthetic polymer film can be produced using the mold 100C in the same way as illustrated with reference to FIG. 6. As shown in FIG. 8B, a UV-curable resin 34' applied between a surface of a work 42 and the mold 100C is irradiated with ultraviolet light (UV) via the mold 100C, whereby the UV-curable resin 34' is cured. The UV-curable resin 34' may be applied to the surface of the work 42 or may be applied to the die surface of the mold 100C (the surface which has the uneven structure). The UV-curable resin used may be, for example, an acrylic resin.

Thereafter, the mold 100C is separated from the work 42, whereby a cured material layer of the UV-curable resin 34' to which the uneven structure of the mold 100C (the uneven structure formed by the plurality of raised portions) is transferred is formed on the surface of the work 42 as shown in FIG. 8C. In this way, a synthetic polymer film 34C is obtained which has an uneven structure that is the inverse of the uneven structure formed by the plurality of raised portions 18pa whose two-dimensional size is not less than 500 nm and not more than 1 μm. The film 50C includes a base film 42 and a synthetic polymer film 34C formed on the base film 42. The synthetic polymer film 34C has a plurality of recessed portions 34Cd at its surface. When viewed in a normal direction of the synthetic polymer film 34C, the two-dimensional size of the recessed portions 34Cd is in the range of not less than 500 nm and not more than 1 μm. The recessed portions 34Cd are demarcated by raised portions 34Cb which correspond to the grain boundaries 18pb. The synthetic polymer film 34C may not have, for example, a flat portion between adjoining recessed portions 34Cd. The flat portion refers to, for example, a portion whose maximum height is less than 10 nm.

The mold sample B was obtained by forming a high-purity aluminum layer (thickness: 4 μm, aluminum purity: 99.99 mass % or higher) on a glass substrate (5 cm×10 cm).

Figure 9A:
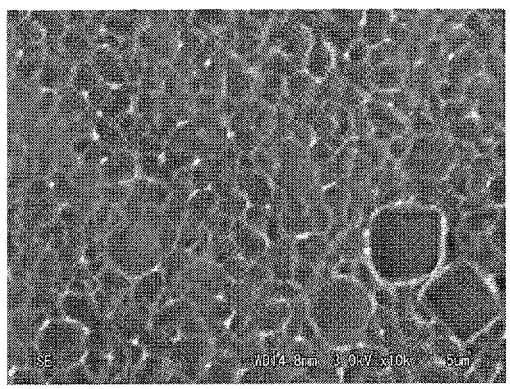
FIG. 9A shows a SEM image of a surface of a mold sample B.
Figure 9B:
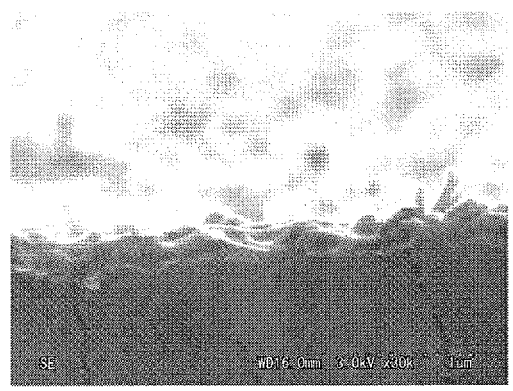
FIG. 9B shows a SEM image of a cross section of the mold sample B.

FIG. 9A shows a SEM image (10000 magnifications) of a surface of the mold sample B. FIG. 9B is a SEM image (30000 magnifications) of a cross section of the mold sample B.

As seen from FIG. 9A, the mold sample B has raised portions corresponding to crystal grains and has recessed portions at the grain boundaries as previously described with reference to FIG. 8. Also, it is seen that the raised portions at the surface of the mold sample B are arranged randomly.

The two-dimensional size of the plurality of raised portions at the surface of the mold sample B was determined from the surface SEM image as follows. A region of 9 μm×12 μm was selected from the surface SEM image (10000 magnifications) of the mold sample B as shown in FIG. 9A. From the selected region, 20 crystal grains, except for crystal grains which are discontinuously large as compared with the majority of the crystal grains (also referred to as "abnormal grains"), were arbitrarily selected, and the average area equivalent circle diameter of the selected crystal grains was determined. For example, grains of particularly large grain diameters which are seen at the lower right corner of the SEM image of FIG. 9A are abnormal grains.

For each sample film, the evaluation results as to the microbicidal ability and the film surface properties are shown in TABLE 4 and TABLE 5 below. The evaluated film surface properties were the spreadability of a water drop over the surface of the synthetic polymer film, the change of the pH of the water drop, and the static contact angle of water with respect to the surface.

[Evaluation of Microbicidal Ability]

The sample films were evaluated as to the microbicidal ability for the bacterial solution (water) sprinkled over the sample films. The sample films to which the bacterial solution was applied and which were left in atmospheric air at room temperature were evaluated as to the microbicidal ability. Herein, the microbicidal ability for *Staphylococcus aureus* was evaluated. A specific evaluation method is described in the following paragraphs. For each sample film, an experiment was carried out with N=3.

Beforehand, each sample film was left for two weeks in an environment of 25° C. and RH 50%. Thereafter, the surface of the sample film was wiped with a BEMCOT wiper (cupro continuous-filament nonwoven fabric manufactured by Asahi Kasei Corporation) impregnated with ethanol.

(1) A bacterial solution including *Staphylococcus aureus* was prepared using 1/500 NB culture medium such that the initial bacteria count was 1E+06 CFU/mL.

(2) On each sample film (a square of 5 cm on each side), 10 μL of the above-described bacterial solution was dropped.

(3) The sample films were left in atmospheric air at room temperature (about 25° C.) for 15 minutes and, thereafter, a SCDLP culture medium was flowed over the sample films to wash away the bacteria (post-wash solution).

(4) The post-wash solution was appropriately diluted with PBS and cultured in the standard agar medium, and the number of bacteria was counted.

The microbicidal ability was evaluated relative to the microbicidal ability of the sample film of Reference Example 1. As previously described, the sample film of Reference Example 1 was a 50 μm thick PET film (A4300 manufactured by TOYOBO CO., LTD.). For the sample film of Reference Example 1, the number of bacteria was counted through the above-described procedure. Each of the sample films was evaluated as to the microbicidal ability in the proportion (%) of the number of bacteria on each sample film to the number of bacteria on the sample film of Reference Example 1. Specifically, the bacteria survival rate was calculated by the following formula:

Bacteria Survival Rate (%)=Number of bacteria on each sample film (aggregate of $N$=3)/Number of bacteria on sample film of Reference Example 1 (aggregate of $N$=3)×100

The criteria for judgement as to the microbicidal ability were based on the bacteria survival rate determined as described above such that ●: 0%, ○: more than 0% and less than 10%, Δ: not less than 10% and less than 50%, ×: not less than 50%. Herein, when the bacteria survival rate was less than 50%, the sample film was judged to be usable.

[Evaluation of Adhesion to Base Film]

The adhesion of the synthetic polymer film to the base film was evaluated as described in the following paragraph.

In an environment where the temperature was 23° C. and the humidity was 50%, 11 vertical incisions and 11 horizontal incisions were formed in a surface of a synthetic polymer film of each sample film (a surface opposite to the base) using a utility knife at intervals of 1 mm in the shape of a grid such that 100 squares (1 mm on each side) were formed. Then, a polyester adhesive tape "No. 31B" manufactured by NITTO DENKO CORPORATION was placed on and pressed against the square portions. Thereafter, the adhesive tape was peeled off in a direction of 90° with respect to the surface of the square portions at a velocity of 100 mm/s. Thereafter, the surface state of the synthetic polymer film on the base was visually observed, and the number of squares from which the polymer layer on the base was not removed, M, was counted.

[Evaluation of Film Surface Properties]

Degree of Spread of Water Over Synthetic Polymer Film

Deionized water was adjusted to pH=7.0±0.1 using 0.01 mol/L hydrochloric acid solution and 0.011 mol/L sodium hydroxide solution. That is, neutral water was prepared in this way.

On the surface of each sample film, a 0.2 cc (200 μL) drop of the above-described pH-adjusted water was placed using a micropipette. Thereafter, the maximum spread diameter (area equivalent circle diameter) up to 5 min was measured, and the average value for five measurements from each sample film was evaluated.

pH Measurement

The measurement of the pH was carried out as follows.

In the same way as that described above, on the surface of each sample film, a 0.2 cc (200 μL) drop of the above-described pH-adjusted water was placed using a micropipette. After the passage of 5 minutes, the aqueous solution (including water in which an extract from the synthetic polymer film was dissolved) on the surface of each sample film was measured using an electrode for flat samples which is described below, and the average value for five measurements from each sample film was evaluated.

Note that a sample film over which the spread of the water was less than 20 mm was evaluated using a sampling sheet mentioned below otherwise the diameter of the water drop increased in the pH measurement.

Electrode: pH electrode, product number: 0040-10D (semiconductor sensor) manufactured by HORIBA, Ltd.

Sampling sheet: sampling sheet B, product number: Y011A manufactured by HORIBA, Ltd.

Measurement of Static Contact Angle of Water

The static contact angle of water with respect to the surface of the synthetic polymer film of each sample film was measured using a contact angle meter (PCA-1 manufactured by Kyowa Interface Science Co., Ltd). A drop of water (about 10 μL) was placed on the surface of the synthetic polymer film of each sample film. The static contact angle was measured at the lapse of 1 second, 10 seconds and 60 seconds since placing the water drop. The contact angle was measured at three locations by a θ/2 method (θ/2=arctan (h/r), θ: contact angle, r: radius of liquid drop, h: height of liquid drop), and the measurements at the three locations were averaged. Herein, the first measurement location was at a central portion of each sample film. The second and third measurement locations were away from the first measurement location by 20 mm or more and were in point symmetry with respect to the first measurement location.

[Identification of Acid]

An acid extracted from each sample film to water was identified as described below using GC-MS (gas chromatograph mass spectrometer).

10 mL THF per 100 cm$^2$ of each sample film was put into a glass container. The sample film was immersed in THF at 50° C. for 3 days. Then, THF was passed through a 0.45 μm membrane filter.

0.1 mL of the filtered solution was condensed in a pyrolysis sample cup. The condensed solution was methylated by adding a 10 μL methylating agent (Tetramethylammonium Hydroxide) aqueous solution. Thereafter, the measurement was carried out under the following conditions.

Pyrolyzer: EGA/PY-3030D manufactured by FRONTIER LAB

Conditions: 400° C./30 sec

GC-MS apparatus: 7890A(GC) 5975C(MS) manufactured by Agilent Technologies

Column: UA5HT-30M-0.1F manufactured by FRONTIER LAB

Conditions: Oven 40° C.→320° C. (20° C./min)

Column flow rate: 1 mL/min

Split ratio: 100:1

TABLE 4

| | Acid Type | Film Surface Properties | | | | | Microbicidal Ability | |
|---|---|---|---|---|---|---|---|---|
| | | pH | Water Spread (mm) | Water Contact Angle (°) | | | Bacteria Survival Rate (%) relative to PET | Judge |
| | | | | 1 sec | 10 sec | 60 sec | | |
| Reference Example 1 | — | 65.8 | 65.2 | 62.4 | 13.5 | 7.0 | 100 | — |
| Reference Example 2 | TMBA | 4.2 | 24.0 | 16.4 | 14.1 | 12.1 | 1.2 | ○ |
| Reference Example 3 | TMBA/DPPA | 4.9 | 24.0 | 16.3 | 14.4 | 12.9 | 42.8 | Δ |
| Reference Example 4 | — | 7.1 | 24.0 | 15.5 | 13.0 | 11.4 | 96.2 | X |
| Reference Example 5 | — | 7.1 | 24.0 | 14.6 | 13.2 | 11.0 | 96.5 | X |
| Reference Example 6 | — | 6.9 | 24.5 | 15.1 | 13.0 | 11.4 | 94.4 | X |

TABLE 5

| | Film Surface Properties | | | | | | Microbicidal Ability | |
|---|---|---|---|---|---|---|---|---|
| | Adhesion | Water Contact Angle (°) | | | Water Spread (mm) | pH | Bacteria Survival Rate (%) relative to PET | Judge |
| | | 1 sec | 10 sec | 60 sec | | | | |
| Comparative Example 1 | 100 | 56.2 | 55.7 | 54.2 | 13.4 | 5.2 | 78.5 | X |
| Example 1 | 100 | 13.9 | 11.3 | 10.6 | 24.5 | 4.4 | 28.6 | Δ |
| Example 2 | 100 | 8.4 | 4.9 | 4.0 | 34.5 | 4.2 | 16.1 | Δ |
| Example 3 | 100 | 10.3 | 7.8 | 4.9 | 34.0 | 3.95 | 1.7 | ○ |
| Example 4 | 100 | 12.3 | 8.9 | 5.8 | 34.0 | 3.82 | 0 | ● |
| Example 5 | 100 | 5.8 | <3 | <3 | 35.0 | 4.1 | 5.2 | ○ |
| Example 6 | 100 | 5.7 | <3 | <3 | 34.5 | 3.7 | 0 | ● |
| Comparative Example 2 | 100 | 6.1 | 3.1 | <3 | 37.5 | 7.1 | 94.5 | X |
| Comparative Example 3 | 100 | 5.0 | <3 | <3 | 47.5 | 6.9 | 85.4 | X |
| Example 7 | 100 | 5.7 | <3 | <3 | 34.5 | 3.7 | 0 | ● |
| Example 8 | 100 | 6.4 | <3 | <3 | 37.5 | 3.2 | 0 | ● |
| Example 9 | 100 | 6.4 | <3 | <3 | 35.0 | 3.4 | 0 | ● |
| Example 10 | 100 | 5.2 | <3 | <3 | 46.0 | 3.3 | 0 | ● |
| Reference Example 7 | 0 | — | — | — | — | — | — | — |
| Example 11 | 100 | 9.4 | <3 | <3 | 49.5 | 3.9 | 0 | ● |
| Example 12 | 100 | 9.8 | <3 | <3 | 49.0 | 3.8 | 0 | ● |

Firstly, see the evaluation results of the sample films of Reference Examples 2 to 6 which are shown in TABLE 4.

The synthetic polymer films of Reference Examples 2 to 6 were produced using different types of photopolymerization initiators in the curable resin as shown in TABLE 2. The sample films of Reference Examples 2 to 6 each include the PET film as the base film and are different only in the type of the photopolymerization initiator contained in the curable resin for formation of the synthetic polymer film.

As shown in TABLE 4, the pH of the sample films of Reference Examples 2 and 3 was not more than 5. In the synthetic polymer films of Reference Examples 2 and 3, the photopolymerization initiator generates an organic carboxylic acid through photodecomposition, and the organic carboxylic acid decreases the pH of water (aqueous solution) on the surface of the sample film. Thus, Reference Examples 2 and 3 has a microbicidal ability. Polymerization initiator 819 used in Reference Example 2 generates 2,4,6-trimethylbenzoic acid (TMBA) through photodecomposition. Polymerization initiator TPO used in Reference Example 3 generates TMBA and diphenyl phosphoric acid (DPPA).

However, TMBA and DPPA are not permitted for use as a food additive, and therefore, the sample films of Reference Examples 2 and 3 can be unsuitable for, for example, food uses.

In contrast, it can be seen that the pH of the sample films of Reference Examples 4 to 6 was in the range of 6.9 to 7.1 and the pH of water (aqueous solution) on the surface of the sample films hardly changed. Polymerization initiators OXE02, 127 and 2959, which were used in Reference Examples 4 to 6, do not generate any acid through photodecomposition. Therefore, Reference Examples 4 to 6 do not have a microbicidal ability.

The sample films of Examples 1 to 12 of the present invention were produced using polymerization initiators OXE02, 127 and 2959 that do not generate any acid through photodecomposition. As will be described in the following section, in a synthetic polymer film of an embodiment of the present invention, a photopolymerization initiator which does not substantially generate any organic carboxylic acid through photodecomposition (e.g., photopolymerization initiator OXE02, 127 or 2959) can be suitably used.

Next, see the evaluation results of Examples 1 to 12, Comparative Examples 1 to 3 and Reference Example 7 which are shown in TABLE 5.

In each of Examples 1 to 12, the pH of the aqueous solution at the lapse of 5 minutes is not more than 5, and the degree of spread of water is not less than 20 mm, so that the synthetic polymer film has an excellent microbicidal ability. The synthetic polymer films of Examples 1 to 12 were formed using a UV-curable resin composition which contained an acrylic monomer having an ethylene oxide unit (EO unit) (M280 and/or M282). Therefore, the synthetic polymer films of Examples 1 to 12 have appropriate hydrophilicity, and the surface having the moth-eye structure is superhydrophilic.

In each of the synthetic polymer films of Examples 1 to 6, polymerization initiator OXE02 was used, and succinic acid was added as the organic carboxylic acid. Succinic acid is permitted for use in food as a Designated Additive. The synthetic polymer films of Examples 1 to 6 have excellent microbicidal ability.

Comparative Example 1 was formed using the same UV-curable resin as that used for Example 1 but using a glass plate as the mold sample. That is, the synthetic polymer film of Comparative Example 1 does not have a plurality of raised portions (moth-eye structure) at its surface. Comparative Example 1 does not have a microbicidal ability.

Example 2 has the same composition as that of Example 1 except that mold releasing agent DL100 was added as the emulsifier. Mold releasing agent DL100 contains glycerol fatty acid ester as shown in TABLE 1A. Glycerol fatty acid ester is permitted for use in food as a Designated Additive. In Example 2, the degree of spread of water is larger and the pH of the aqueous solution at the lapse of 5 minutes is lower than in Example 1. Example 2 has a better microbicidal ability than Example 1. In Examples 3 and 4, the proportion of the contained succinic acid is higher than in Example 2. The proportion of the contained succinic acid is higher in Example 4 than in Example 3 and is higher in Example 3 than in Example 2. As seen from the results of Examples 2 to 4, as the proportion of the contained succinic acid increases, the microbicidal ability is more excellent.

As in Examples 2 to 4, a synthetic polymer film of an embodiment of the present invention may contain an emulsifier (surfactant) in addition to an antimicrobial additive (e.g., organic carboxylic acid). The emulsifier used is an additive which is permitted by law for addition to food. It is estimated that, when the synthetic polymer film contained an emulsifier, the aqueous solution on the surface of the synthetic polymer film was more likely to spread, and the microbicidal ability of the synthetic polymer film improved. The HLB value of the emulsifier is preferably not less than 7 and not more than 14, more preferably not less than 9 and not more than 11. If the HLB value of the emulsifier is less than 7, the aqueous solution on the surface of the synthetic polymer film is unlikely to spread so that the microbicidal ability can decrease. If the HLB value of the emulsifier is more than 14, the solubility of the organic carboxylic acid in water is sometimes excessively high so that the microbicidal effect deteriorates earlier.

The proportion of the emulsifier mixed in the photocurable resin to the entirety of the photocurable resin may be approximately not less than 0.1 mass % and not more than 5 mass %. If it is less than 0.1 mass %, the effect of improving the microbicidal ability cannot be achieved in some cases. If it is more than about 5 mass %, there is a probability that the physical properties of the cured material (photocured resin) deteriorate. To further improve the microbicidal effect of the synthetic polymer film, it is preferably not less than about 0.5 mass %. To suppress the influence on the physical properties of the cured material, it is preferably not more than about 3 mass %.

The curable resin of Example 5 had the same composition as that of the curable resin of Example 4 except that the acrylic monomer component was changed and water was added. In Example 6, the proportion of the contained succinic acid is higher than in Example 5. Example 6 has a more excellent microbicidal ability than Example 5.

It is estimated that, by adding water to the curable resin, the organic carboxylic acid was more readily extracted so that the pH decreased, and the hydrophilicity of the surface increased so that the degree of spread of water increased.

When water is added to and mixed in the UV-curable resin, the stability decreases. Therefore, it is preferred that addition of water is carried out immediately before the light irradiation step in the above-described production method. The amount of water is preferably not less than 1 mass % and not more than 10 mass % with respect to the entirety of the photocurable resin. If it is less than 1 mass %, the effect achieved by the addition of water cannot be achieved in some cases. If it is more than 10 mass %, a homogeneous composition cannot be realized in some cases.

Comparative Example 2 is different from the composition of Example 5 in that Comparative Example 2 does not contain succinic acid. Comparative Example 3 is realized by adding an emulsifier (mold releasing agent DL100) to the composition of Comparative Example 2. Comparative Examples 2 and 3 do not contain any organic carboxylic acid and therefore do not have a microbicidal ability.

Examples 7 to 9 have the same composition as that of Example 6 except that the type of the added organic carboxylic acid was changed. The additive used in Example 7 was adipic acid. The additive used in Example 8 was malic acid. The additives used in Example 9 were phytic acid and succinic acid. Adipic acid and malic acid are permitted for use in food as a Designated Additive. Phytic acid is permitted for use in food as an Existing Food Additive. Each of Examples 7 to 9 has an excellent microbicidal ability.

Example 10 was produced using a curable resin which has the same composition as that of Example 9 but using the mold sample B. That is, the synthetic polymer film of Example 10 has a different uneven surface structure from that of the synthetic polymer film of Example 9. Example 10 also has an excellent microbicidal ability as well as Example 9.

As seen from the results of Example 10, a synthetic polymer film of an embodiment of the present invention has an excellent microbicidal ability so long as a plurality of recessed portions at the surface of the synthetic polymer film are in the range of, for example, not less than 500 nm and not more than 1 μm. That is, it is estimated that so long as the pH of the aqueous solution at the lapse of 5 minutes is not more than 5 and the degree of spread of water is not less than 20 mm, the synthetic polymer film has an excellent microbicidal ability irrespective of whether the structure at the surface of the synthetic polymer film is a plurality of raised portions or a plurality of recessed portions. In this case, it is estimated that the two-dimensional size of the plurality of raised portions or the plurality of recessed portions only needs to be in the range of more than 20 nm and not more than 1 μm.

The mold sample B used in Examples 10 to 12 can be obtained only by forming crystal grains of a desired size (e.g., the average grain diameter is not less than 500 nm and not more than 1 μm). That is, it is not necessary to perform anodization as in formation of the moth-eye mold. Thus, the mold sample B can be manufactured at a low cost. Also, advantageously, the mold sample B is excellent in transferability.

The sample films of Examples 1 to 10 include the TAC film as the base film. In contrast, the sample films of Examples 11 and 12 include the PET film as the base film.

As described in Japanese Patent Application No. 2017-176590 of the present applicant, the present applicant found that a 2-(2-vinyloxy ethoxy)ethyl (meth)acrylate monomer was a promising candidate for the acrylic monomer which can improve adhesion with a PC film. The entire disclosures of Japanese Patent Application No. 2017-176590 are incorporated by reference in this specification. If, for example, the proportion of the ethylene oxide unit contained in the cross-linked structure of a synthetic polymer film to the entirety of the synthetic polymer film is not less than 35 mass % and less than 70 mass % and the proportion of a 2-(2-vinyloxy ethoxy)ethyl (meth)acrylate monomer unit contained in the cross-linked structure of the synthetic polymer film to the entirety of the synthetic polymer film is not less than 15 mass % and less than 45 mass %, the synthetic polymer film can have excellent PC adhesion and excellent microbicidal ability. PC is a resin which generally exhibits high physical properties among engineering plastics and has been widely used particularly because of its excellent shock resistance and heat resistance.

In Examples 11 and 12, VEEA manufactured by NIPPON SHOKUBAI CO., LTD. was used as the 2-(2-vinyloxy ethoxy)ethyl acrylate. Example 11 has the same composition as that of Example 4 except that VEEA was added to the acrylic monomer component, polymerization initiator OXE02 is replaced by 127, and emulsifier (mold releasing agent) DL100 is replaced by C250. Mold releasing agent C250 contains sorbitan fatty acid ester as shown in TABLE 1A. Sorbitan fatty acid ester is permitted for use in food as a Designated Additive. Example 12 has the same composition as that of Example 11 except that polymerization initiator 127 is replaced by 2959. Examples 11 and 12 have an excellent microbicidal ability as well as Example 4. Further, Examples 11 and 12 have excellent adhesion with a PC film.

In Reference Example 7, a PC film was used as the base film, and the curable resin used did not contain any 2-(2-vinyloxy ethoxy)ethyl (meth)acrylate monomer. Reference Example 7 has inferior adhesion with a PC film.

Examples 1 to 10 in which a TAC film was used as the base film had acceptable adhesion with the TAC film.

The other examples of the PC film than those used in the above-described examples include "CARBOGLASS (registered trademark)" manufactured by AGC Inc., "PUREACE (registered trademark)" manufactured by TEIJIN LIMITED, and "Makrofol (registered trademark)" manufactured by Covestro.

In the foregoing, an example of a multilayer film including a polycarbonate film and a synthetic polymer film wherein the polycarbonate film was used as the base film has been described, although the present invention is not limited to this example. For example, a plastic molded product of polycarbonate can be used as the plastic base. In this case, a moth-eye mold may be used which is manufactured using an aluminum film deposited on a glass base of a desired shape.

In the foregoing, a molded product which includes a base film (e.g., polycarbonate film) and a synthetic polymer film provided on the base film is illustrated as a molded product (plastic product) which includes a synthetic polymer film whose surface has a microbicidal activity, although the present invention is not limited to this example. A plastic molded product of polycarbonate which has an arbitrary shape can be used as the plastic base. It is not limited to a polycarbonate molded product but may be a base in which polycarbonate is present at least on a surface on which the synthetic polymer film is to be formed. By laminating a molded product of various shapes with a multilayer film which includes a polycarbonate film and a synthetic polymer film, excellent microbicidal ability can be given to the surface of the molded product of various shapes.

When a base film (e.g., polycarbonate film) is used as the base, a synthetic polymer film can be mass-produced according to the above-described roll-to-roll method. Therefore, in consideration of the mass productivity, it is preferred to use a synthetic polymer film of which the cross-linked structure contains none of a nitrogen element (which is a constituent of a urethane bond) and a fluorine element as will be described later. However, the synthetic polymer film of an embodiment of the present invention is not limited to this example but can be produced by various methods. When any other production method is used, as a matter of course, the cross-linked structure may contain a nitrogen element (which is a constituent of a urethane bond) and/or a fluorine element.

The present inventors conducted research and found that the synthetic polymer films described in WO 2015/163018, WO 2016/080245, WO 2016/208540 and WO 2016/104421 still have room for improvement in mass productivity (transferability). One of the possible reasons is that the synthetic polymer films described in WO 2015/163018, WO 2016/080245, WO 2016/208540 and WO 2016/104421 are formed using a photocurable resin which contains an acrylate which has a urethane bond. The acrylate which has a urethane bond has relatively high viscosity and is therefore likely to deteriorate the mold releasability. Thus, for example, such an acrylate causes deterioration of the productivity in mass production based on a roll-to-roll method.

Herein, the UV-curable resin has been described, although a resin which can be cured with visible light can be used. Note that, however, the UV-curable resin is preferred because it can be stored and handled easily.

In the example described herein, the synthetic polymer film contains an organic carboxylic acid as the antimicrobial additive which is permitted by law for addition to food and which has an antimicrobial effect. However, the present invention is not limited to the above-described example. For example, an organic carboxylic acid selected from Designated Additives or Existing Food Additives can be used. Examples of the organic carboxylic acid which are Designated Additives or Existing Food Additives are shown in TABLE 6B. Particularly, succinic acid, adipic acid, citric acid, alginic acid and phytic acid can be suitably used.

The organic carboxylic acid may be mixed in the photocurable resin composition such that the proportion of the organic carboxylic acid to the entirety of the photocurable resin composition is generally equal to or greater than 0.1 mass % and not more than 10 mass %. If the proportion is less than 0.1 mass %, the effect of improving the microbicidal ability cannot be achieved sometimes. If the proportion is more than about 10 mass %, there is a concern that the organic carboxylic acid may deteriorate the physical properties of the cured material (photocured resin composition). To further improve the microbicidal effect of the synthetic polymer film, it is preferred that the proportion is not less than about 1 mass %. To suppress the influence on the physical properties of the cured material, it is preferred that the proportion is not more than about 5 mass %. Specifically, the amount of the contained organic carboxylic acid may be properly adjusted according to the type of the photocurable resin and the type of the organic carboxylic acid. The same applies to the other antimicrobial additives than the organic carboxylic acid.

It is preferred that the solubility of the organic carboxylic acid (antimicrobial additive) in water is not excessively high. This is because, if the solubility of the organic carboxylic acid in water is excessively high, the microbicidal effect in a high-temperature, high-humidity environment decreases earlier. For example, it is preferred that the organic carboxylic acid is not unlimitedly soluble in water (the solubility index is from 1 to 7). For example, succinic acid, adipic acid, citric acid and alginic acid are not unlimitedly soluble in water and therefore can be suitably used. For example, the amount of water required for dissolving 1 g of the organic carboxylic acid may be equal to or greater than 1 mL and less than 10000 mL (the solubility index is from 2 to 6). It may be equal to or greater than 10 mL or may be less than 100 mL.

The solubility of a solute in water at about 20° C. to about 25° C. is represented based on the amount of water required for dissolving 1 g or 1 mL of the solute using the solubility index (1 to 7) and the terms shown below.
  0: Unlimitedly soluble
  1: Very soluble
    Less than 1 mL
  2: Freely soluble
    Equal to or greater than 1 mL and less than 10 mL
  3: Soluble
    Equal to or greater than 10 mL and less than 30 mL
  4: Sparingly soluble
    Equal to or greater than 30 mL and less than 100 mL
  5: Slightly soluble
    Equal to or greater than 100 mL and less than 1000 mL
  6: Very slightly soluble
    Equal to or greater than 1000 mL and less than 10000 mL
  7: Practically insoluble
    Not less than 10000 mL The solubility in water of respective antimicrobial additives is shown in TABLE 6A and TABLE 6B below. "o" means that the antimicrobial additive is unlimitedly soluble in water (the solubility index is 0). "x" means that the antimicrobial additive is not unlimitedly soluble in water (the solubility index is from 1 to 7). Some of the "x" symbols are accompanied by the solubility index (1 to 7).

Examples of the antimicrobial additive which has an antimicrobial effect, other than the organic carboxylic acid, include antifungal agents and natural extracts which have an antimicrobial effect. Examples of the antifungal agents and the natural extracts which have an antimicrobial effect are also shown in TABLE 6A.

TABLE 6A

| TYPE | NAME | JAPAN LIST | No. | CAS No. | PRODUCT NAME | MANUFACTURER | Water Solubility/ HLB value |
|---|---|---|---|---|---|---|---|
| Antifungal Agents | Imazalil orthophenyl phenol and sodium orthophenyl phenol | List of Designated Additives | 61 92 | | | | |
| | thiabendazole | | 244 | | | | |
| | fludioxonil | | 350 | | | | |
| Natural Extract | hop extract | List of Ordinary Foods Used as Food Additives | 27 | 8016-25-9 | HOP IN HOPLEX | Asama Chemical. Co., Ltd. MITSUBISHI- CHEMICAL FOODS CORPORATION | ○ |
| | mustard extract | List of Existing Food Additives | 64 | 57-06-7 | ADINUMBER 201 | Asama Chemical. Co., Ltd. | X |
| | chitosan | | 84 | 9012-76-4 | KOYO CHITOSAN FL-80 | KOYO CHEMICAL CO., LTD. | X |
| | chitin | | 82 | 1398-61-4 | chitin | KIMICA Corporation | X |
| Emulsifier | glycerol fatty acid ester | List of Designated Additives | 119 | 977050-69-3 | POEM M-100 POEM DM-100 POEM DL-100 POEM J-0381V POEM J-0021 | RIKEN VITAMIN | 7.0 8.7 9.4 12 15.5 |
| | sucrose fatty acid ester | | 219 | 977019-37-6 | DK ester F-70 DK ester F-90 DK ester F-110 DK ester F-140 DK ester F-160 | DKS Co. Ltd. | 8 9.5 11 13 15 |

TABLE 6A-continued

| TYPE | NAME | JAPAN LIST | No. | CAS No. | PRODUCT NAME | MANUFACTURER | Water Solubility/ HLB value |
|---|---|---|---|---|---|---|---|
| | sorbitan fatty acid ester | | 232 | 1338-41-6 | Rikemal L-250A POEM C-250 | RIKEN VITAMIN | 7.4 10.6 |
| | propylene glycol fatty acid ester | | 361 | | Rikemal PL-100 | RIKEN VITAMIN | 4.2 |
| | lecithin | List of Existing Food Additives | 127 130 166 279 346 | 8002-43-5 | SLP-WHITE SLP-WHITELYSO | Tsuji Oil Mills co., Ltd. | |

TABLE 6B

| TYPE | NAME | JAPAN LIST | No. | CAS No. | PRODUCT NAME | MANUFACTURER | Water Solubility/ HLB value |
|---|---|---|---|---|---|---|---|
| Organic Carboxylic Acid | fatty acids | List of Designated Additives | 189 | | | | ○~X |
| | alginic acid | List of Existing Food Additives | 22 | 9005-32-7 | | | X |
| | adipic acid | List of Designated Additives | 5 | 124-04-9 | adipic acid | SATUMA KAKO CO., LTD. | X(4) |
| | benzoic acid | | 40 | | benzoic acid | FUSHIMI Pharmaceutical Co., Ltd. | X |
| | octanoic acid | | 89 | | | | X |
| | citric acid | | 108 | 77-92-9 | citric acid (crystal) | SATUMA KAKO CO., LTD. | X |
| | gluconic acid | | 123 | | | | ○ |
| | succinic acid | | 143 | 110-15-6 | succinic acid | NIPPON SHOKUBAI | X(3) |
| | sorbic acid | | 234 | | | | X |
| | lactic acid | | 286 | | lactic acid | Showa Kako Corp. | ○ |
| | malic acid | | 437 | 6915-15-7 | malic acid | Showa Kako Corp. | X |
| | glacial acetic acid | | 322 | | | | ○ |
| | fumaric acid | | 348 | | fumaric acid | NIPPON SHOKUBAI | X |
| | itaconic acid | List of Existing Food Additives | 29 | | | | X |
| | folic acid | | 412 | | | | ○ |
| | butyric acid | List of Designated Additives | 413 | 107-92-6 | | | ○ |
| | phytic acid | List of Existing Food Additives | 261 | 83-86-3 | phytic acid FC | FC CHEMICAL Co., Ltd. | ○ |
| | phosphoric acid | List of Designated Additives | 439 | | | | ○ |
| | sulfuric acid | | 428 | | | | ○ |

In countries other than Japan, a substance which has an antimicrobial effect may be selected from those permitted for addition to food by the laws of respective countries.

For example, in the United States, the following substances are permitted by law for direct addition to food.

(1) Food Additives

Direct Additives: Food additives permitted for direct addition to food for human consumption (21 CFR Part 172)

Secondary Direct Additives: Food additives permitted for addition for the purpose of, for example, enhancing the processing of foods, such as enzyme preparations (21 CFR Part 173)

(2) GRAS (Generally Recognized as Safe) Substances

GRAS Substances: Substances generally recognized as safe (21 CFR Part 182)

GRAS Direct Additives: Substances added directly to human food affirmed as generally recognized as safe (GRAS) by the Food and Drug Administration (FDA) (21 CFR Part 184)

Substances listed in the GRAS Notification (FDA GRAS Notification)

(3) Color Additives (21 CFR Part 74, 82)

TABLE 7A and TABLE 7B show the permission status in the United States of the antimicrobial additives listed in TABLE 6A and TABLE 6B. In the United States, postharvest chemicals including antifungal agents are classified in agricultural chemicals.

TABLE 7A

| TYPE | NAME | JAPAN LIST | No. | CAS No. | NAME | United States CLASSIFICATION | No. |
|---|---|---|---|---|---|---|---|
| Antifungal Agent | Imazalil orthophenyl phenol and sodium orthophenyl phenol | List of Designated Additives | 61 92 | | | | |
| | thiabendazole | | 244 | | | | |
| | fludioxonil | | 350 | | | | |
| Natural Extract | hop extract | List of Ordinary Foods Used as Food Additives | 27 | 8016-25-9 | Modified hop extract | FDA Direct Food Additives | CITE: 21CFR172.560 |
| | mustard extract | List of Existing Food Additives | 64 | 57-06-7 | ALLYL ISOTHIOCYANATE | FDA Direct Food Additives | CITE: 21CFR172.515 |
| | chitosan | | 84 | 9012-76-4 | chitosan | | not listed |
| | chitin | | 82 | 1398-61-4 | chitin | | not listed |
| Emulsifier | glycerol fatty acid ester | List of Designated Additives | 119 | 977050-69-3 | Polyglycerol esters of fatty acids | FDA Direct Food Additives | CITE: 21CFR172.854 |
| | sucrose fatty acid ester | | 219 | 977019-37-6 | Sucrose fatty acid ester | FDA Direct Food Additives | CITE: 21CFR172.859 |
| | sorbitan fatty acid ester | | 232 | 1338-41-6 | SORBITAN MONOSTEARATE | FDA Direct Food Additives | CITE: 21CFR172.842 |
| | propylene glycol fatty acid ester | | 361 | | | | |
| | lecithin | List of Existing Food Additives | 127 130 166 279 346 | 8002-43-5 | lecithin | List of GRAS Substances | CITE: 21CFR184.1400 |

TABLE 7B

| TYPE | NAME | JAPAN LIST | No. | CAS No. | NAME | United States CLASSIFICATION | No. |
|---|---|---|---|---|---|---|---|
| Organic Carboxylic Acid | fatty acids | List of Designated Additives | 189 | | | | |
| | alginic acid | List of Existing Food Additives | 22 | 9005-32-7 | ALGINIC ACID | GRAS Direct Additives | CITE: 21CFR184.1011 |
| | adipic acid | List of Designated Additives | 5 | 124-04-9 | adipic acid | GRAS Direct Additives | CITE: 21CFR184.1009 |
| | benzoic acid | | 40 | | | | |
| | octanoic acid | | 89 | | | | |
| | citric acid | | 108 | 77-92-9 | citric acid | FDA Direct Food Additives GRAS Direct Additives | CITE: 21CFR172.755 CITE: 21CFR172.861 CITE: 21CFR184.1033 |

TABLE 7B-continued

| TYPE | NAME | JAPAN LIST | No. | CAS No. | NAME | United States CLASSIFICATION | No. |
|---|---|---|---|---|---|---|---|
| | gluconic acid | | 123 | | | | |
| | succinic acid | | 143 | 110-15-6 | SUCCINIC ACID | FDA Direct Food Additives GRAS Direct Additives | CITE: 21CFR172.861 CITE: 21CFR184.1091 |
| | sorbic acid | | 234 | | | | CITE: 21CFR182.3089 |
| | lactic acid | | 286 | | | | |
| | malic acid | | 437 | 6915-15-7 | malic acid | GRAS Direct Additives | CITE: 21CFR184.1069 |
| | glacial acetic acid | | 322 | | | | |
| | fumaric acid | | 348 | | | | |
| | itaconic acid | List of Existing Food Additives | 29 | | | | |
| | folic acid | List of | 412 | | | | |
| | butyric acid | Designated Additives | 413 | 107-92-6 | butyric acid | | CITE: 21CFR182.60 not listed |
| | phytic acid | List of Existing Food Additives | 261 | 83-86-3 | phytic acid | | |
| | phosphoric acid | List of Designated Additives | 439 | | | | |
| | sulfuric acid | | 428 | | | | |

A synthetic polymer film of an embodiment of the present invention is suitably used in, for example, food uses. A synthetic polymer film of an embodiment of the present invention is suitably used in, for example, a film for food and a container for food (e.g., tray).

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2018-048186 filed on Mar. 15, 2018, the entire contents of which are hereby incorporated by reference.

What is claimed is:

1. A synthetic polymer film whose surface has a plurality of raised or recessed portions, the synthetic polymer film comprising:
   an emulsifier which is approved by U.S. Food and Drug Administration for addition to food or is a generally recognized as safe (GRAS) substance as of Mar. 15, 2018, wherein
   the synthetic polymer film includes a cross-linked structure, and
   the synthetic polymer film contains an antimicrobial additive which is approved by the U.S. Food and Drug Administration for addition to food or is a generally recognized as safe (GRAS) substance as of Mar. 15, 2018 and which has an antimicrobial effect,
   the antimicrobial additive contains an organic carboxylic acid,
   at a lapse of 5 minutes since placing a 200 L drop of water on the surface of the synthetic polymer film, a pH of an aqueous solution is not more than 5, and an area equivalent circle diameter of the aqueous solution is not less than 20 mm, and
   a hydrophilic-lipophilic balance (HLB) value of the emulsifier is not less than 7 and not more than 14.

2. The synthetic polymer film of claim 1, wherein when viewed in a normal direction of the synthetic polymer film, a two-dimensional size of the plurality of raised or recessed portions is in the range of more than 20 nm and not more than 1 µm.

3. The synthetic polymer film of claim 1, wherein when viewed in a normal direction of the synthetic polymer film, a two-dimensional size of the plurality of raised or recessed portions is less than 500 nm.

4. The synthetic polymer film of claim 3, wherein the plurality of raised or recessed portions include a plurality of raised portions constituting a moth-eye structure.

5. The synthetic polymer film of claim 1, wherein when viewed in a normal direction of the synthetic polymer film, a two-dimensional size of the plurality of raised or recessed portions is not less than 500 nm.

6. The synthetic polymer film of claim 5, wherein the plurality of raised or recessed portions include a plurality of recessed portions obtained by inverting a plurality of crystal grains present at a surface of an aluminum layer.

7. The synthetic polymer film of claim 1, wherein an amount of water required for dissolving 1 g of the organic carboxylic acid is equal to or greater than 1 mL and less than 10000 mL.

8. The synthetic polymer film of claim 1, wherein the organic carboxylic acid is succinic acid, adipic acid, citric acid, alginic acid or phytic acid.

9. The synthetic polymer film of claim 1, wherein the synthetic polymer film is made of a photocurable resin which contains a photopolymerization initiator.

10. The synthetic polymer film of claim 9, wherein a proportion of the antimicrobial additive contained in the photocurable resin to an entirety of the photocurable resin is not less than 0.1 mass % and not more than 10 mass %.

11. The synthetic polymer film of claim 9, wherein the photopolymerization initiator does not generate any organic carboxylic acid through photodecomposition.

12. The synthetic polymer film of claim 9, wherein the photocurable resin is radically polymerizable.

13. The synthetic polymer film of claim 9, wherein the photopolymerization initiator contains at least one of the group consisting of ethanone,1-[9-ethyl-6-(2-methylbenzoyl)-9H-carbazole-3-yl]-,1-(O-acetyloxime), 2-hydroxy-1-{4-[4-(2-hydroxy-2-methyl-propionyl)-benzyl]-phenyl}-2-methyl-propan-1-one, and 1-[4-(2-hydroxyethoxy)-phenyl]-2-hydroxy-2-methyl-1-propane-1-one.

14. The synthetic polymer film of claim 1, wherein the cross-linked structure contains none of a nitrogen element which is a constituent of a urethane bond and a fluorine element.

15. The synthetic polymer film of claim 1, wherein the cross-linked structure contains an ethylene oxide unit.

16. The synthetic polymer film of claim 1, wherein the cross-linked structure contains a 2-(2-vinyloxy ethoxy)ethyl (meth)acrylate monomer unit.

17. A plastic product, comprising:
a plastic base which has a surface; and
the synthetic polymer film as set forth in claim 1, the synthetic polymer film being provided on the surface of the plastic base.

18. The plastic product of claim 17, wherein
the plastic base includes at least one film of the group consisting of a triacetyl cellulose film, a polyethylene terephthalate film, and a polycarbonate film.

19. The plastic product of claim 17, wherein
the plastic base contains polycarbonate, and
the plastic product forms a container.

20. A method for sterilizing a liquid including water by bringing the liquid into contact with the surface of the synthetic polymer film as set forth in claim 1.

21. A photocurable resin composition for use in production of the synthetic polymer film as set forth in claim 1, comprising:
a photocurable resin;
the antimicrobial additive; and
a photopolymerization initiator.

22. The photocurable resin of claim 21, wherein the photopolymerization initiator contains at least one of the group consisting of ethanone,1-[9-ethyl-6-(2-methylbenzoyl)-9H-carbazole-3-yl]-,1-(O-acetyloxime), 2-hydroxy-1-{4-[4-(2-hydroxy-2-methyl-propionyl)-benzyl]-phenyl}-2-methyl-propan-1-one, and 1-[4-(2-hydroxyethoxy)-phenyl]-2-hydroxy-2-methyl-1-propane-1-one.

23. A manufacturing method of a synthetic polymer film, comprising a step of mixing water in the photocurable resin composition as set forth in claim 21 and thereafter irradiating the resultant photocurable resin composition with light.

24. The synthetic polymer film of claim 1, wherein the emulsifier contains at least one of the group consisting of glycerol fatty acid ester, sucrose fatty acid ester, sorbitan fatty acid ester, and lecithin.

25. The synthetic polymer film of claim 1, wherein the synthetic polymer film is made of a photocurable resin which contains a photopolymerization initiator, and a proportion of the emulsifier contained in the photocurable resin to an entirety of the photocurable resin is not less than 0.1 mass % and not more than 5 mass %.

26. The synthetic polymer film of claim 1, wherein the cross-linked structure contains a monomer unit whose molecular weight is not more than 300.

* * * * *